US009648175B2

United States Patent
Niimura

(10) Patent No.: US 9,648,175 B2
(45) Date of Patent: May 9, 2017

(54) USAGE TRACKING IN A DISTRIBUTED SCAN SYSTEM

(71) Applicant: Kenji Niimura, Santa Clara, CA (US)

(72) Inventor: Kenji Niimura, Santa Clara, CA (US)

(73) Assignee: Ricoh Company, Ltd., Tokyo (JP)

( * ) Notice: Subject to any disclaimer, the term of this patent is extended or adjusted under 35 U.S.C. 154(b) by 84 days.

(21) Appl. No.: 14/067,702

(22) Filed: Oct. 30, 2013

(65) Prior Publication Data

US 2015/0116745 A1    Apr. 30, 2015

(51) Int. Cl.
*H04N 1/00* (2006.01)
*G06F 3/12* (2006.01)
*H04N 1/32* (2006.01)

(52) U.S. Cl.
CPC ....... *H04N 1/00225* (2013.01); *H04N 1/0097* (2013.01); *H04N 1/00244* (2013.01); *H04N 1/00411* (2013.01); *H04N 1/00954* (2013.01); *H04N 1/32101* (2013.01); *H04N 2201/001* (2013.01); *H04N 2201/0013* (2013.01); *H04N 2201/0081* (2013.01); *H04N 2201/3205* (2013.01); *H04N 2201/3222* (2013.01); *H04N 2201/3276* (2013.01); *H04N 2201/3278* (2013.01)

(58) Field of Classification Search
CPC .............. G06F 3/1273; H04N 1/00225; H04N 1/00954; H04N 1/32101; H04N 1/00244; H04N 1/0097; H04N 2201/001
USPC ...................................................... 358/1.15
See application file for complete search history.

(56) References Cited

U.S. PATENT DOCUMENTS

| 7,570,398 B2 * | 8/2009 | Tian ......................... H04N 1/44 358/296 |
| 8,572,752 B2 | 10/2013 | Ma et al. |
| 2002/0131059 A1 | 9/2002 | Tsuchitoi |

(Continued)

FOREIGN PATENT DOCUMENTS

| EP | 2 015 554 A1 | 1/2009 |
| EP | 2015554 A1 | 1/2009 |

(Continued)

OTHER PUBLICATIONS

Zhang et al., "A Rule-based Framework for Role-based Delegation and Revocation", ACM Transactions on Information and System Security, vol. 6, No. 3, dated Aug. 1, 2003, 38 pages.

(Continued)

*Primary Examiner* — Eric A Rust
(74) *Attorney, Agent, or Firm* — Hickman Palermo Becker Bingham LLP; Malgorzata A. Kulczycka

(57) ABSTRACT

Approaches are provided for identifying, in a particular scan process definition that corresponds to the particular user interface object: scan settings data, processing settings data, and service tracking information; generating metadata that includes at least a portion of the scan settings data; and transmitting the scan data, the metadata, the processing settings data and the service tracking information to the scan server for processing, wherein processing of the tracking information by the scan server causes the scan server to generate service tracking data that includes at least a portion of the metadata and specifies processing of the scan data by a plurality of network services that are separate from both the scan device and the scan server.

20 Claims, 9 Drawing Sheets

(56) References Cited

U.S. PATENT DOCUMENTS

| | | | |
|---|---|---|---|
| 2002/0191200 A1 | 12/2002 | Sakai et al. | |
| 2004/0133598 A1 | 7/2004 | Dobrowski et al. | |
| 2006/0215208 A1 | 9/2006 | Takayama | |
| 2006/0290967 A1 | 12/2006 | Sumitomo et al. | |
| 2006/0293765 A1 | 12/2006 | Tanaka et al. | |
| 2007/0047006 A1 | 3/2007 | Sakai | |
| 2007/0083935 A1 | 4/2007 | Uchikawa et al. | |
| 2007/0127069 A1 | 6/2007 | Steele et al. | |
| 2007/0177192 A1 | 8/2007 | Wang | |
| 2007/0263260 A1 | 11/2007 | Ohta | |
| 2008/0022212 A1 | 1/2008 | Kodimer et al. | |
| 2008/0037049 A1 | 2/2008 | Bahl et al. | |
| 2008/0137129 A1* | 6/2008 | Ferlitsch | H04N 1/00209 358/1.15 |
| 2008/0212131 A1 | 9/2008 | Osada | |
| 2008/0259380 A1 | 10/2008 | Nuggehalli | |
| 2009/0174897 A1 | 7/2009 | Sato | |
| 2009/0193499 A1 | 7/2009 | Srivastava et al. | |
| 2009/0219561 A1 | 9/2009 | Kozuka | |
| 2009/0240697 A1 | 9/2009 | Fenelon | |
| 2009/0290190 A1 | 11/2009 | Torii | |
| 2009/0316208 A1* | 12/2009 | Watanabe | H04N 1/4413 358/1.15 |
| 2010/0094639 A1 | 4/2010 | Rhoads | |
| 2010/0110471 A1 | 5/2010 | Inoue | |
| 2010/0110485 A1 | 5/2010 | Watariuchi | |
| 2010/0110486 A1 | 5/2010 | Takano | |
| 2010/0157349 A1 | 6/2010 | Hong | |
| 2010/0188712 A1 | 7/2010 | Makishima et al. | |
| 2010/0208283 A1 | 8/2010 | Mori et al. | |
| 2010/0245909 A1 | 9/2010 | Yamaguchi | |
| 2010/0302582 A1 | 12/2010 | Yoshimura | |
| 2010/0306775 A1 | 12/2010 | Appiah et al. | |
| 2011/0051182 A1 | 3/2011 | Sugiyama | |
| 2011/0125781 A1 | 5/2011 | Kasahara | |
| 2011/0131513 A1 | 6/2011 | Yamatoto | |
| 2011/0149352 A1 | 6/2011 | Ding | |
| 2012/0002243 A1 | 1/2012 | Merna et al. | |
| 2012/0050790 A1 | 3/2012 | Hong | |
| 2012/0194837 A1 | 8/2012 | Kamata | |
| 2012/0327446 A1 | 12/2012 | Fukasawa | |
| 2013/0125134 A1* | 5/2013 | Ota | G06F 3/12 718/106 |
| 2013/0155443 A1 | 6/2013 | Wu et al. | |
| 2013/0215453 A1 | 8/2013 | Ding et al. | |
| 2013/0222861 A1 | 8/2013 | Ding et al. | |
| 2014/0253933 A1 | 9/2014 | Selvaraj et al. | |
| 2014/0253941 A1 | 9/2014 | Selvaraj | |
| 2014/0253942 A1 | 9/2014 | Selvaraj | |
| 2014/0254795 A1 | 9/2014 | Selvaraj | |
| 2014/0258500 A1 | 9/2014 | Selvaraji | |

FOREIGN PATENT DOCUMENTS

| | | |
|---|---|---|
| EP | 2 421 228 A1 | 2/2012 |
| EP | 2421228 A1 | 2/2012 |

OTHER PUBLICATIONS

Krzysztof Pytko: "Active Directory rights delegation—overview", iSiek's blog about Microsoft Windows Services, dated May 16, 2012, 16 pages.

Hameed: Windows 7/Windows Server 2008, R2: Distributed Scan Management, dated Oct. 11, 2009, 4 pages.

European Patent Office, "Search Report" in application No. 14158031.6-1955, dated May 22, 2014, 9 pages.

European Patent Office, "Search Report" in application No. 14157991.2-1955, dated May 22, 2014, 9 pages.

Hameed: "Windows 7/ Windows Server 2008 R2: Distributed Scan Management", dated Oct. 11, 2009, 4 pages.

European Patent Office, "Search Report" in application No. 14157499.6-1903, dated Feb. 12, 2015, 10 pages.

The State Intellectual Property Office, "Search Report" in application No. 2014100745692, dated Mar. 25, 2016, 13 pages.

U.S. Appl. No. 13/398,704, filed Feb. 16, 2012, Office Action, Jan. 12, 2015.

U.S. Appl. No. 13/406,401, filed Feb. 27, 2012, Office Action, Aug. 13, 2013.

U.S. Appl. No. 13/331,992, filed Dec. 20, 2011, Office Action, Apr. 9, 2014.

U.S. Appl. No. 13/331,992, filed Dec. 20, 2011, Final Office Action, Nov. 17, 2014.

U.S. Appl. No. 13/331,992, filed Dec. 20, 2011, Notice of Allowance, Apr. 23, 2015.

U.S. Appl. No. 13/331,992, filed 12/20/20110, Final Office Action, Dec. 26, 2013.

U.S. Appl. No. 13/398,704, filed Feb. 16, 2012, Final Office Action, Jun. 24, 2014.

U.S. Appl. No. 13/398,704, filed Feb. 16, 2012, Notice of Allowance, Oct. 19, 2015.

U.S. Appl. No. 13/331,992, filed Dec. 20, 2011, Office Action, Aug. 13, 2013.

U.S. Appl. No. 13/398,704, filed Feb. 16, 2012, Final Office Action, Aug. 5, 2013.

U.S. Appl. No. 13/398,704, filed Feb. 6, 2012, Final Office Action, Nov. 27, 2013.

U.S. Appl. No. 13/398,704, filed Feb. 16, 2012, Office Action, Mar. 19, 2014.

U.S. Appl. No. 13/406,401, filed Feb. 27, 2012, Notice of Allowance, Dec. 11, 2013.

U.S. Appl. No. 14/872,933, filed Oct. 1, 2015, Advisory Action, Jul. 11, 2016.

U.S. Appl. No. 14/872,933, filed Oct. 1, 2015, Final Office Action, Apr. 21, 2016.

U.S. Appl. No. 14/872,933, filed Oct. 1, 2015, Notice of Allowance, Sep. 21, 2016.

U.S. Appl. No. 14/872,933, filed Oct. 1, 2015, Office Action Oct. 23, 2015.

U.S. Appl. No. 13/398,704, filed Feb. 16, 2012, Office Action, Jul. 30, 2013.

U.S. Appl. No. 13/398,704, filed Feb. 16, 2012, Advisory Action, Sep. 30, 2014.

Mike Fenelon and Erhan Soyer-Osman: "Distributed Scan Management", Internet Citation, dated Nov. 6, 2008, 25 pages.

Hameed: "Windows 7/ Windows Server, 2008, R2: Distributed Scan Management", dated Oct. 11, 2009, 4 pages.

European Patent Office, "Search Report" in application No. 12198673.1-1903, dated Sep. 1, 2014, 7 pages.

2011 Microsoft Windows, "Distributed Scan Processing Web Service Protocol Summary", dated Dec. 1, 2011, 3 pgs.

U.S. Appl. No. 13/786,458, filed Mar. 6, 2013, Notice of Allowance, Feb. 20, 2015.

U.S. Appl. No. 13/786,460, filed Mar. 6, 2013, Office Action, Mar. 13, 2014.

U.S. Appl. No. 13/786,460, filed Mar. 6, 2013, Notice of Allowance, May 1, 2014.

U.S. Appl. No. 13/786,458, filed Mar. 6, 2013, Office Action, Mar. 11, 2014.

U.S. Appl. No. 13/786,455, filed Mar. 6, 2013, Office Action, May 2, 2014.

U.S. Appl. No. 13/786,461, filed Mar. 6, 2013, Office Action, Jun. 23, 2014.

U.S. Appl. No. 13/786,458, filed Mar. 6, 2013, Office Action, Jul. 10, 2014.

U.S. Appl. No. 13/786,456, filed Mar. 6, 2013, Final Office Aciton, Jun. 13, 2014.

U.S. Appl. No. 13/786,455, filed Mar. 6, 2013, Notice of Allowance, Jun. 24, 2014.

U.S. Appl. No. 13/786,461, filed Mar. 6, 2013, Notice of Allowance, Aug. 15, 2014.

U.S. Appl. No. 13/786,456, filed Mar. 6, 2013, Final Office Action, Oct. 7, 2014.

U.S. Appl. No. 13/786,458, filed Mar. 6, 2013, Final Office Action, Dec. 3, 2014.

(56) References Cited

OTHER PUBLICATIONS

U.S. Appl. No. 13/786,456, filed Mar. 6, 2013, Notice of Allowance, Dec. 17, 2014.
U.S. Appl. No. 14/518,299, filed Oct. 20, 2014, Notice of Allowance, Nov. 30, 2015.

* cited by examiner

```xml
<?xml version="1.0"?>
<psp:PostScanProcess xmlns:ihv="http://schemas.abcd.com/expense"
xmlns:wscn="http://schemas.microsoft.com/windows/2006/08/wdp/scan"
xmlns:psp="http://schemas.microsoft.com/windows/2008/02/imaging/postscan/psp">
        <psp:ScanRepository>WIN-9V2HTUID7VU.etdtest.com</psp:ScanRepository>
    <psp:ScanTicket>
        <wscn:JobDescription>
            <wscn:JobName>BW100-Legal</wscn:JobName>
            <wscn:JobOriginatingUserName>00000000002EB8C0</wscn:JobOriginatingUserName>
            <wscn:JobInformation/>
        </wscn:JobDescription>
        <wscn:DocumentParameters>
            <wscn:Format wscn:MustHonor="false">tiff-single-g4</wscn:Format>
            <wscn:MediaSides>
                <wscn:MediaFront>
                    <wscn:ColorProcessing wscn:MustHonor="true">BlackAndWhite1</wscn:ColorProcessing>
                    <wscn:Resolution wscn:MustHonor="true">
                        <wscn:Width>100</wscn:Width>
                        <wscn:Height>100</wscn:Height>
                    </wscn:Resolution>
                </wscn:MediaFront>
            </wscn:MediaSides>
        </wscn:DocumentParameters>
    </psp:ScanTicket>
    <psp:PostScanInstructions>
        <psp:ContinueOnError>true</psp:ContinueOnError>
        <psp:DocumentRootName>legal</psp:DocumentRootName>
        <psp:FiltersToProcess>
            <psp:Filter>
                <psp:Dialect>http://schemas.microsoft.com/windows/2007/10/imaging/postscan/filter/fileshare</psp:Dialect>
                <psp:Instructions>
                    <fsf:FileShareConfig
                    xmlns:fsf="http://schemas.microsoft.com/windows/2007/10/imaging/postscan/filter/file">
                        <fsf:FileShares>
                            <fsf:ShareUNC>c:\Scanned-Legal</fsf:ShareUNC>
                            <ihv:url>http://www.abcd.com/expense/receiptStore/submit.html</ihv:url>
                            <ihv:item-id>receipt</ihv:item-id>
                            <ihv:content-type>receipt</ihv:content-type>
                            <ihv:comment/>
                        </fsf:FileShares>
                        <ihv:service-tracking>true</ihv:service-tracking>
                        <ihv:service-tracking-url>191.123.3.2:8000</ihv:service-tracking-url>
                    </fsf:FileShareConfig>
                </psp:Instructions>
            </psp:Filter>
        </psp:FiltersToProcess>
    </psp:PostScanInstructions>
</psp:PostScanProcess>
```

*FIG. 5*

USAGE TRACKING IN A DISTRIBUTED SCAN SYSTEM

RELATED CASES

This application is related to U.S. patent application Ser. No. 13/786,455, titled, "METADATA SUPPORT IN A DISTRIBUTED SCAN SYSTEM" filed on Mar. 6, 2013, the contents of which are incorporated by reference as if fully set forth herein for all purposes.

This application is related to U.S. patent application Ser. No. 13/786,456, titled, "RIGHTS MANAGEMENT IN A DISTRIBUTED SCAN SYSTEM" filed on Mar. 6, 2013, the contents of which are incorporated by reference as if fully set forth herein for all purposes.

This application is related to U.S. patent application Ser. No. 13/786,458, titled, "DISTRIBUTED PRINT MANAGEMENT" filed on Mar. 6, 2013, the contents of which are incorporated by reference as if fully set forth herein.

This application is related to U.S. patent application Ser. No. 13/786,460, titled, "DEVICE MANAGEMENT IN A DISTRIBUTED SCAN SYSTEM" filed on Mar. 6, 2013, the contents of which are incorporated by reference as if fully set forth herein for all purposes.

This application is related to U.S. patent application Ser. No. 13/786,461, titled, "DELEGATE ACCESS IN A DISTRIBUTED SCAN SYSTEM" filed on Mar. 6, 2013, the contents of which are incorporated by reference as if fully set forth herein for all purposes.

FIELD OF THE INVENTION

Embodiments relate generally to distributed scan management, and more specifically, to tracking a usage of resources and services involved in generating scan data and post-scan processing of the scan data.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Distributed networks provide access to a variety of devices and peripherals, and facilitate access to a variety of computer-based services. However, as the distributed networks grow and expand their services, managing the resources and processes in the networks and accounting for the performed services become complex and difficult. Managing the workflow and processing may become especially difficult when the requests pertain to a variety of processing services, and when the requests are issued by multiple users and user groups.

In some distributed networks, resources and processing services are managed using a centralized management approach. For example, a centralized management system may assist in processing requests for scanning documents, and assist in post-scan processing of the scan data. A centralized management system may also be used to detect scanning devices installed in the network and to monitor the operational status of the devices.

SUMMARY

Approaches are described for tracking a usage of resources configured to generate scan data and for tracking a usage of services configured to perform post-scan processing of the scan data. The usage tracking may be implemented in a variety of systems, including distributed scan management systems, and may be helpful in tracking the cost associated with using the resources and services. In particular, the tracking may provide cost-related data for billing and accounting purposes.

In an embodiment, the approach is implemented in a scan device. The scan device may comprise user interface, one or more processors, and one or more memories storing instructions which, when processed by the one or more processors, cause performance of the approach-specific steps.

In an embodiment, user identification data is received by a scan device. The user identification data may be used to identify a user, a group of users or an organization of users. The user identification data is used to retrieve scan process definitions data. The scan process definitions data may be retrieved from a scan definitions server, and over one or more networks.

A scan process definition may be represented by scan process definition data. The scan process definition data identifies a scan process definition that defines one or more sets of instructions for generating scan data and processing the scan data.

In a related embodiment, one or more user interface objects are displayed on the user interface. The user interface objects correspond to one or more scan process definitions. The user interface objects may be used to visually communicate to a user the one or more scan process definitions that are available to the user.

A user may select one of the user interface objects, and the selection may be received from the user via a user interface. The user input may indicate a selection of a particular user interface object from the one or more user interface objects. The user input may indicate a particular user interface object, and may be used to identify a particular scan process definition, corresponding to the particular user interface object.

In a related embodiment, a particular scan process definition comprises scan settings data, processing settings data and service tracking information. The scan settings data may specify one or more scan settings to be used by a scan device to generate scan data. The processing settings data may specify the type of processing to be performed on the scan data by one or more network services. The network services may be separate from both the scan device and a scan server. The service tracking information may specify whether a service tracking is to be performed as the scan data is generated and as the scan data is processed.

Based upon the scan settings data, a scan device generates scan data. As the scan data is generated, the scan device also generates metadata. The metadata may include at least a portion of the scan settings data.

The scan data, metadata, processing settings data and service tracking information are transmitted to a scan server for processing. The processing of the received information by the scan server causes the scan server to generate service tracking data. The service tracking data may include at least a portion of the metadata and may specify the type of processing that is to be performed on the scan data by a plurality of network services.

The service tracking information and the service tracking data may be transmitted to a service usage tracking system for further processing and determining a usage of the resources and services in the network.

BRIEF DESCRIPTION OF THE DRAWINGS

The present disclosure is illustrated by way of example, and not by way of limitation, in the figures of the accom

FIG. 5 depicts example post-scan processing code that includes usage tracking instructions, according to an embodiment;

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

Various aspects of the invention are described hereinafter in the following sections:

I. OVERVIEW
II. SYSTEM ARCHITECTURE
III. SERVICE USAGE TRACKING SYSTEM
  A. Tracking Scanning Services
  B. Tracking Email-Related Services
  C. Tracking OCR-Based Processing
  D. Tracking File Sharing
  E. Other Types of Tracking
IV. DISTRIBUTED SCAN MANAGEMENT SYSTEM
V. ADMINISTRATOR TERMINAL
  A. Generating Scan Process Definitions
  B. Example Scan Process Definition
  C. Example Post-Scan Process Definition Containing Tracking Instructions
VI. SCAN PROCESS DEFINITION SERVER
  A. Storing Scan Process Definitions
  B. Processing Requests for Scan Process Definitions
VII. SCAN DEVICE
  A. Processing Scan Jobs
  B. Generating Metadata and Service Tracking Information
  C. Using Metadata and Service Tracking Information to Track A Usage of Resources and Services
VIII. SCAN SERVER
  A. Storing Scan Data
  B. Initiating Post-Scan Processing
  C. Generating Service Tracking Data
  D. Using Service Tracking Data to Track A Usage of Resources and Services
IX. USAGE TRACKING
  A. Usage Tracking Implemented in a Scan Device
  B. Usage Tracking Implemented in a Scan Server
X. IMPLEMENTATION MECHANISMS I. Overview Techniques are provided for tracking a usage of resources configured to generate scan data and tracking a usage of services configured to perform post-scan processing of the scan data in a distributed scan system. The usage tracking may be helpful in tracking the cost associated with using the resources and services in the distributed scan system. In particular, the tracking may provide cost-related data for billing and accounting purposes.

II. System Architecture

Figure 1:
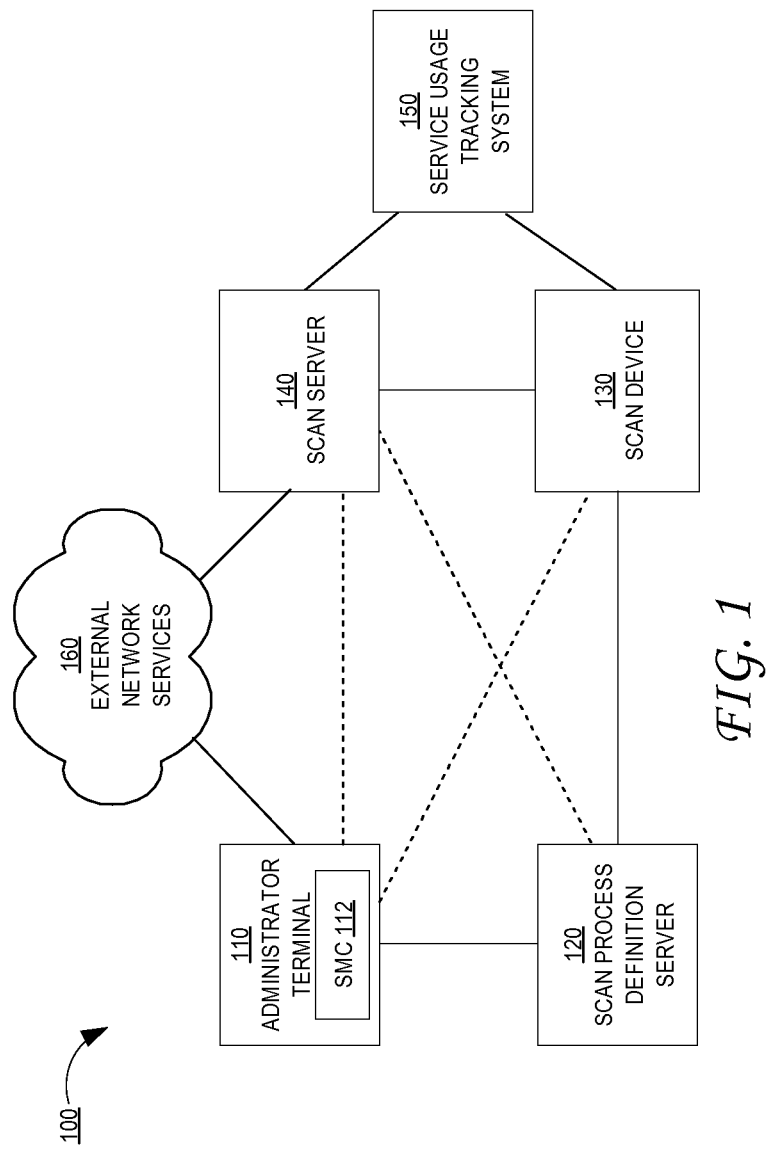
- FIG. 1 is a block diagram that depicts an example system architecture for tracking a usage in a distributed scan management system, according to an embodiment.

FIG. 1 is a block diagram that depicts an example system architecture 100 for tracking a usage in a distributed scan management system, according to an embodiment. System 100 includes one or more administrator terminals 110, one or more scan process definition servers 120, one or more scan devices 130, one or more scan servers 140, one or more service usage tracking systems 150, and one or more external network services 160. The components of system 100 may be communicatively coupled to each other via one or more data communications networks and/or direct connections. Examples of data communications networks include, without limitation, one or more local area networks (LANs), wide area networks (WANs), and other Internet-based computer networks.

Administrator terminal 110 is a computing device configured to allow an administrator to define the manner in which scanning and post-scan processing may be performed in a distributed scan management system. Example computing devices implementing administrator terminal 110 include, without limitation, a server, a desktop computer, a laptop computer, or a tablet computer.

Administrator terminal 110 may be configured with a scan management console (SMC), such as SMC 112. SMC 112 may be implemented in software, hardware, or any combination of software and hardware. In an embodiment, SMC 112 is part of the Microsoft Management Console (MMC) Windows Server technology.

Administrator terminal 110 may be communicatively coupled to scan process definition server 120 and external network services 160. Optionally, administrator terminal 110 may also be connected directly or indirectly to scan device 130 or scan server 140.

Scan process definition server 120, also referred to as a definition server 120, is a computing device that comprises one or more processors and one or more storage media for storing instructions which, when processed by the processors, perform operations such as storing data, responding to queries for data, retrieving data, and transmitting data to requestors. Definition server 120 may be configured as a standalone device, or may be integrated with other devices. For example, definition server 120 may be integrated with administrator terminal 110, and implemented with administrator terminal 110 on the same computing device.

Definition server 120 may be configured to store scan process definitions. Scan process definitions may contain information describing the manner in which scanning of one or more documents is to be performed in a distribution scan management system. Scan process definitions are described in detail below.

Depending upon a particular implementation, definition server 120 may store scan process definition data locally on definition server 120, or remotely. Definition server 120 may also store scan process identification data, also referred to as identifiers that identify one or more scan process definitions.

Definition server 120 may be configured to respond to requests received from other devices. The requests may be received for example, from SMC 112, scan device 130 and scan server 140, and may pertain to storing, modifying and retrieving the scan process definitions. Definition server 120 may also be configured to respond to requests for the scan process definitions. Such request may be received from scan devices and scan servers.

Scan device 130 is a device configured to generate scan data. Scan device 130 may be implemented as a standalone scan device, configured to perform a set of specialized functions for generating scan data. Alternatively, scan device 130 may be implemented in a multifunction peripheral (MFP) device, configured to perform not only the specialized functions for generating scan data, but also to perform printing, copying, sending and receiving facsimiles, and the like.

Scan device 130 may include a user interface (UI) configured to receive input from a user, and display information for the user. The UI may include a control panel, a display panel, a touchscreen, and one or more input receiving devices, including buttons, trackballs and the like.

Scan device 130 may be configured to communicate with users and other devices. For example, scan device 130 may be configured to communicate with administrator terminal 110, scan process definition server 120, scan server 140, and service usage tracking system 150.

In an embodiment, scan device 130 is configured to communicate with a user, scan process definition server 120, and scan server 140. For example, scan device 130 may be configured to receive user input indicating user identification data, and transmit the user identification data to scan process definition server 120.

Scan device 130 may also be configured to display one or more UI graphical objects, corresponding to various scan process definitions. Scan device 130 may allow a user to select a particular UI graphical object from the displayed UI graphical objects, receive user input indicating the user selection, determine an identifier associated with the selected UI graphical object, and send the identifier to scan process definition server 120 requesting a particular scan process definition indicated by the identifier. Upon receiving, from scan process definition server 120, data representing the particular scan process definition, scan device 130 may extract scan settings data from the particular scan process definition, generate scan data according to the scan settings data, and transmit the scan data to scan server 140.

Scan device 130 may also extract processing settings data from a particular scan process definition, and transmit the processing settings data to scan server 140. The processing settings data indicates the type of post-scan processing that is to be performed on the scan data.

A scan process definition may also include service tracking information. The service tracking information provides information that may be useful in tracking a usage of resources and tracking a usage of processing services performed for a user. Scan device 130 may extract the service tracking information from the scan process definition, and transmit the service tracking information to scan server 140. The service tracking information is described in detail below.

Scan server 140 is a computing device that comprises one or more processors and storage media that stores instructions which, when processed by the one or more processors, cause performance of operations on scan data. Scan server 140 may special-purpose hardware logic for generating scan data and post-scan processing of the scan data.

Scan server 140 may be configured to receive scan data from one or more scan devices 130, and cause the scan data to be stored, or processed and then stored. Scan server 140 may store the scan data in a network folder, send the scan data to one or more recipients, or send the scan data to third party storage services, such as external network services 160.

In an embodiment, scan server 140 maintains an event log that contains information regarding different scan jobs. The event log may contain data that indicates the type of the scan job performed for a user, the identification data of the user who requested the scan job, the timestamps associated with initiating and completing the scan job, the identifier of the scan process definition which was used in processing the scan job, and the errors or messages that were generated as the scan data was created. The event log may also contain the scan job characteristics, including a number of the scanned pages, a total size of the scan data, the type of paper used to generate the scan data, and the like.

Scan server 140 may also maintain an event log that contains information regarding one or more services performed on scan data. For example, the event log may contain data that indicates the type of post-scan processing that was performed, identification data of the entity that requested the processing, timestamps associated with initiating and completing the processing, identification data of the post-scan processing definition used in the post-scan processing, and post-processing characteristics, including a number of the processed pages, a total size of the processed data, the type of paper used by the post-scan processing, and the like.

Service usage tracking system 150 is a system configured to track a usage of resources involved in generating scan data and to track usage of services involved in post-scan processing of the scan data. The tracking may be performed upon receiving a request from various devices, including one or more scan devices 130, one or more scan servers 140, or from administrator terminal 110. The tracking may be performed in relation to individual users, groups of users, organizations, departments, and other entities that may be identified among the users of system 100.

Tracking of a usage of resources and services may pertain to performing a variety of tasks and collecting various types of data. For example, the tracking may pertain to tracking a count of pages that were scanned, printed, and processed for a user or a group of users. The tracking may also pertain to tracking a count of color copies generated for a user or a group of users, tracking a storage space that has been allocated for storing electronic mails (emails), files, documents, pictures, or other items for a user or a group of users. Furthermore, the tracking may pertain to tracking a count of pages that were processed using an optical character recognition (OCR) approach, or other type of image processing for a user or a group of users.

Generating scan data by scan device may be tracked. The tracking may be performed for each user, for some users, or for some groups of users. To facilitate the tracking, scan device 130 may generate metadata, and transmit the metadata along with scan settings data, processing settings data and service tracking information to scan server 140. Scan server 140 may use the received information to generate service tracking data, and transmit the service tracking data, and other data to service usage tracking system 150. For example, to facilitate usage tracking, scan device 130 may transmit to scan server 140 the information indicating a count of pages that scan device 130 generated for a user, a type of finish of the scan data, and the like; scan server 140 may process the received information, add to that information data indicating a count of pages that were generated from the scan data using an OCR-based approach, and transmit the counts, along with other types of information, to service usage tracking system 150. Service usage tracking system 150 may use the received data to update usage tracking records stored in a database, and generate billing invoices for the services performed for the users.

External network services 160 collectively represent various data processing services offered by external servers and pertaining to post-processing of scan data. The external servers may include servers hosted by service providers and other servers configured to execute server applications.

A service application may be any type of the application configured to process data. Examples of service applications may include email-processing applications, OCR-based processing applications, word processing applications, spreadsheet programs, file sharing applications, an image processing application, and the like. For example, if a user requests an OCR-based processing of scan data, the request and scan data may be sent to one of the external servers configured to perform the OCR-based processing.

Figure 2:
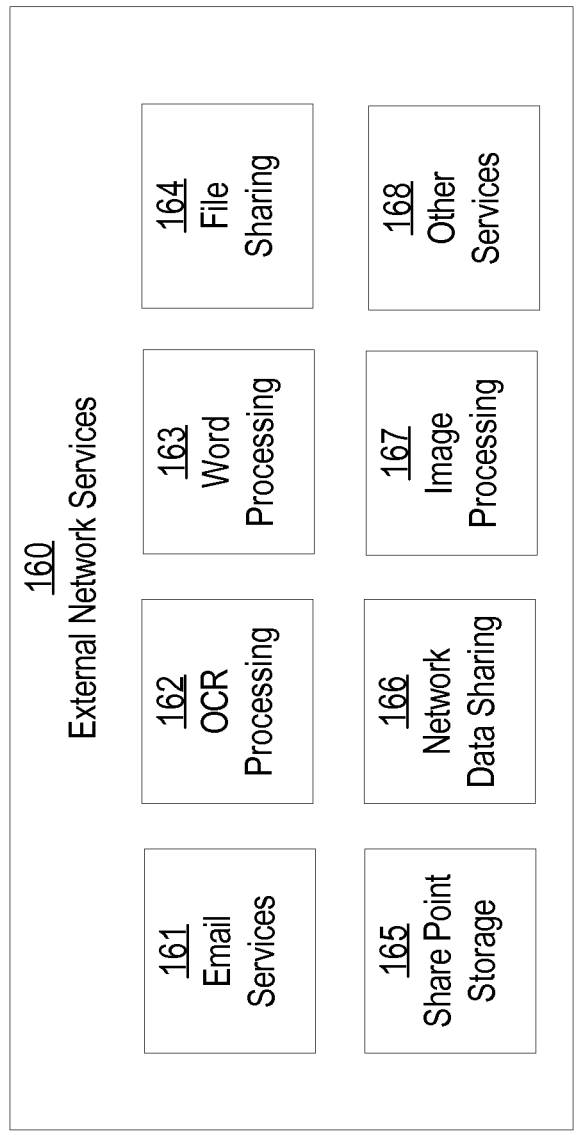
FIG. 2 is a block diagram that depicts an example overview of various types of external network services provided in a distributed scan management system, according to an embodiment.

FIG. 2 is a block diagram that depicts an example overview of various types of external network services 160 provided in a distributed scan management system, according to an embodiment. The examples depicted in FIG. 2 include email services 161, OCR-based processing 162, word processing 163, file sharing processing 164, share point storage services 165, network data sharing 166, image processing 167, and other services 168. Other services 168 may include spreadsheet processing, data-format translation processing, and the like.

Usage of the external network services 160 may be tracked. For example, if a user requests an OCR-based processing of scan data, then a count of pages processed by an OCR-based processing application may be determined and provided by the OCR-based processing application to scan server 140 and then, to service usage tracking system 150.

III. Service Usage Tracking System

Service usage tracking system 150 may be implemented in any type of a computer-based system, including a distributed scan management system. Service usage tracking system 150, also referred to herein as "tracking system 150," may be an integral component of a server device, and may be configured to provide a set of functionalities, including a usage tracking. Tracking system 150 is depicted in the figures and sometimes described herein as being implemented as a separate entity for purposes of explanation but embodiments are not limited to this example context and tracking system 150 may be implemented as part of other elements, for example, scan device 130, scan server 140, external network services 160, etc. Alternatively, tracking system 150 may be implemented as a specialized service device configured to track a usage of the resources and services in the distributed scan management system.

Tracking system 150 may be configured to track a usage of resources configured to generate scan data and to track a usage of services configured to perform post-scan processing of the scan data. The tracking may include receiving scan settings data, processing settings data, scan data and service tracking information and data from scan devices 130 and scan servers 140. Furthermore, the tracking may involve receiving and collecting information from devices providing external network services 160.

Tracking system 150 may be configured to track a usage of resources and services for users, groups of users, organizations, and other entities of users. For example, tracking system 150 may track the counts of scan pages generated for a particular user or a group of users. Tracking system 150 may also track the counts of pages processed using an OCR-based processing, or the size of the storage space on a data server dedicated to store emails for a user or a group of users.

In an embodiment, tracking system 150 may create and store various data structures to be used for storing counts, indicators and information helpful in tracking a usage of resources and services. For example, tracking system 150 may store current counter values, quota values, limit values, threshold values, cost metrics, and other information helpful in determining the usage.

In some implementations, the resources and services may be available to users free-of-charge. However, in other implementations, the usage of the resources and services may be associated with a fee. In the implementations in which the usage of the resources and services is not free-of-charge, tracking system 150 collects data representing the respective charges. The data representing the usage of the resources and services may be transmitted to billing and accounting departments to generate invoices for the rendered services.

Upon receiving data representing a usage of the resources and services by a user or a group of users, a billing department may determine the costs of the rendered services, generate invoices indicating the costs, and disseminate the invoices to the users or the groups.

Figure 3:
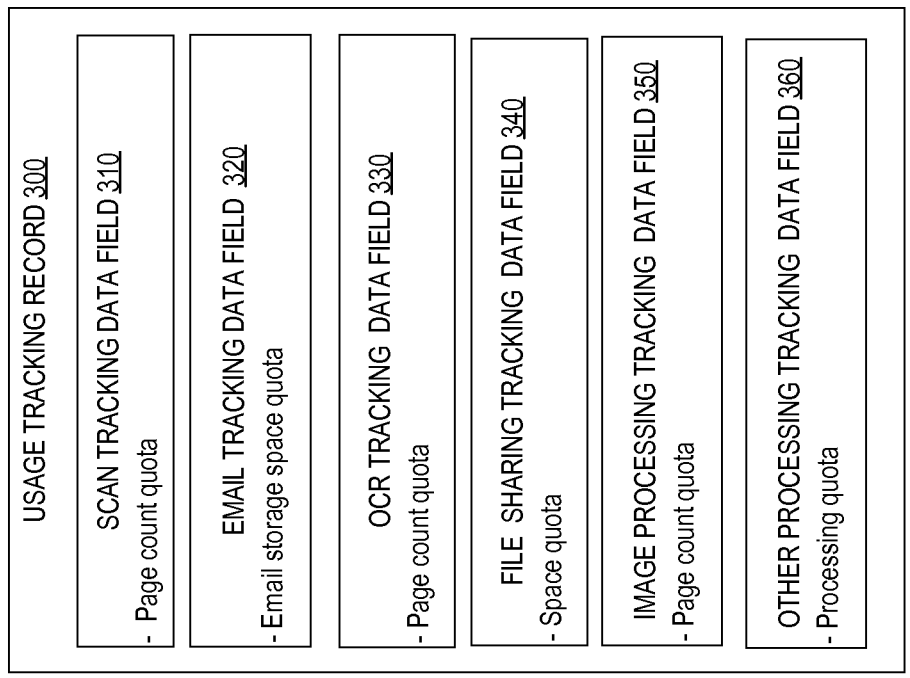
FIG. 3 is a block diagram that depicts an example data structure for storing various types of tracked information, according to an embodiment.

FIG. 3 is a block diagram that depicts an example data structure used for storing a usage tracking record 300. Usage tracking record 300 may be maintained for individual users, groups of users or organizations, and may be used for storing various types of tracked information maintained for the users.

Usage tracking record 300 may be used for storing various types of information, including up-to-date count values, quota values, limit values, threshold values, and the like. The data structure may be represented as a continuous memory space, a set of memory space fragments, a continuous disk space, or a set disk space fragments. The data structure may be indexed using physical addresses, logical addresses or pointers, which may point to various storage spaces maintained by storage devices.

In an embodiment, usage tracking record 300 comprises various fields for storing data. The fields may include a scan tracking data field 310, an email tracking data field 320, an OCR-based processing tracking data field 320, a file sharing data field 340, an image processing tracking data field 350, and one or more other processing tracking data fields 360 for other types of processing. In other embodiments, usage tracking record 300 may comprise some, but not all data fields listed above, or may comprise additional data fields.

Scan tracking data field 310 may be used to store any type of information useful in tracking a usage of resources configured to generate scan data. For example, scan tracking data field 310 may store a page count quota established for a user, a current count of scan data pages generated for the user, and the like.

Email tracking data field 320 may be used to store any type of information useful in tracking a usage of email folders and storage space for storing emails. For example, email tracking data field 320 may store an email storage space quota for a user, a current size of the email storage space dedicated to store the emails for the user, and the like.

OCR-based processing tracking field 330 may be used to store any type of information useful in tracking a usage of the OCR-based processing. For example, OCR-based processing tracking field 330 may store a page count quota for a user, a current page count for the user, and the like.

File sharing data field 340 may be used to store any type of information useful in tracking a usage of storage space dedicated to file-sharing. For example, file sharing data field 340 may store a space quota established for a user, a current space size of the files shared by the user, and the like.

Image processing tracking data field 350 may be used to store any type of information useful in tracking a usage of any particular image processing services performed for users and groups of users. For example, image processing tracking data field 350 may store a page count quota for a user, a current page count for the user, and the like.

Other processing tracking data field 360 may be used to store any type of information useful in tracking a usage of any other type of processing not mentioned above. For example, processing tracking data field 360 may store a processing quota for storing spreadsheets generated by a user, a current processing count the user, and the like.

Usage tracking record 300 depicted in FIG. 3 depicts one of many possible representations of data structures that may be used by a tracking system 150. Other data structures may include data tables, data lists, and the like.

A. Tracking Scanning Services

In an embodiment, tracking system 150 is configured to track a usage of resources configured to generate scan data for a user. The tracking may involve collecting various types of information pertaining to a request for generating scan data, as well as indicating any specific scan-related settings requested by the user.

Scanning tracking may be performed without imposing any specific restrictions on a usage of the scanning resources. For example, a user may request to generate scan data without any specific limitations, and not be billed for generating the scan data. According to another example, the users who work on a particular project may have an unlimited access to the scanning services, and pay a flat monthly fee regardless of the quantity of scanned or otherwise processed pages. According to other example, the users may be charged per each page they request to have scanned; in some cases, there may be limits on the quantity of pages that the users may request to have scanned during a particular period of time.

Usage tracking may be combined with imposing one or more restrictions on the usage of the resources and services. For example, a particular user may requests scanning of no more than 500 pages per month. This type of restriction may be implemented using a scheme of quotas or limits.

Quotas may be defined by managers, project leaders or system administrators. The quotas may be stored in a database associated with tracking system 150, or otherwise accessible to tracking system 150. For example, upon receiving a user requests for generating scan data, the count of the pages to be scanned is determined, and the count is compared with a predetermined quota value. If the count exceeds the quota value, then the system refuses to generate the scan data for the user, and notifies the user that scanning the data would cause the quota violation. However, if the count does not exceed the quota value, then the system generates the scan data for the user, updates the counts, and provides the service tracking data and metadata to tracking system 150.

B. Tracking Email-Related Services

Tracking system 150 may be configured to track a usage of storage space dedicated to storing email folders, attachments and other email-related data. The tracking may involve generating information indicating a size of the storage space occupied by the emails and attachments stored for a user, generating information indicating a size of the storage space that is available to the user, and generating cost-related data representing a cost for providing email-storage capacity to the user.

In some implementations, email-related services may be provided to a user free-of-charge. For example, one or more services, such as storing emails for a user, maintaining email folders for the user and facilitating sending, replying, forwarding and deleting operations on the emails, may be provided to a user free-of-charge. The free-of-charge services may be tracked; however, no charge or cost is imposed on the user. In other implementations, a user may be charged for the storage space blocks that are dedicated to store the email folders for the user.

Furthermore, there may be some limits on the storage space blocks that may be allocated on storage devices for a user. For example, a user may have a certain number of data blocks assigned to the user in a data cloud and dedicated for storing data. The user may be billed for the assigned data blocks on the monthly bases. The user may request an increase of the number of blocks, and thus be billed for the additional data blocks as well.

C. Tracking OCR-Based Processing

In an embodiment, tracking system 150 is configured to track a usage of services implementing an OCR-based processing. The tracking may involve generating information indicating a count of pages processed using the OCR-based processing, generating information indicating the specific settings and options to be used in the OCR-based processing, and generating other types of information related to the OCR-based processing. Furthermore, the tracking may involve maintaining various counters for a user or a group of users, and using the counters to determine whether a user may request the OCR-based processing. Moreover, the tracking may involve maintaining various data structures for storing cost data, quotas or limit-related data.

Usage tracking of the OCR-based processing may involve collecting a variety of information. For example, if a user requests an OCR-based processing of scan data, then a count of pages to be processed and the specific settings for the OCR-based processing of the scan data may be determined and communicated to tracking system 150. Upon receiving the counts and the post-scan processing specific data, tracking system 150 may update data in a data structure maintained by tracking system 150 for the user, and provide the updated data for billing and accounting purposes.

Usage tracking of the OCR-based processing may be performed without imposing any specific restrictions on the usage. For example, users may be allowed to request an OCR-based processing without adhering to any specific page limits, and the like. According to another example, users who work on a particular project may have an unlimited access to the OCR-based processing, and pay a flat monthly fee regardless of the quantity of the processed pages.

Usage tracking of the OCR-based processing may be combined with imposing one or more restrictions the usage. For example, a user may request the OCR-based processing for no more than 500 pages per month. This type of restriction may be implemented using a scheme of quotas or limits. For example, each time a user requests the OCR-based processing, the count of the pages to be processed is determined, and the count is compared with a predetermined quota value. If the count exceeds the quota value, then the system may refuse to perform the processing for the user, and may notify the user that the processing would cause a violation of the quota. However, if the count does not exceed the quota value, then the system may perform the processing for the user, generate service tracking data indicating the processing, and provide the service tracking data along with other information to tracking system 150.

Tracking of a usage of the OCR-based processing may implement a cost scheme. A cost scheme may specify a page-processing-cost and a monthly page count quota for each type of processing performed for a user. Hence, if a user requests an OCR-based processing of ten pages, the page-processing-cost is 10¢ per page, and the OCR-based processing of ten pages would not exceed the monthly page count quota for the user, then tracking system 150 collects information indicating that the user is to be charged 10*10¢=$1 for the processing, and that information is provided to a billing and accounting department.

D. Tracking File Sharing

In an embodiment, tracking system 150 is configured to track a usage of services implementing file sharing. The tracking may involve generating information indicating a count of files that are shared by users and groups of users, a size of the storage space dedicated for storing the files shared among the users and groups of users, and other data indicative of the file-sharing services provided to the users and groups.

Tracking of file-sharing-related services may involve computing a cost of the services provided to a user, as well as imposing some limitations on a size of the space dedicated to storing the shared files. For example, a user may be allowed to request a certain number of storage space blocks for storing shared files. By tracking the count of the blocks allocated on the storage devices for the user, tracking system 150 may determine whether the count is within the allocated quota. Furthermore, tracking system 150 may impose certain restrictions on a count of the files that a user may share with other users, on a number of users with whom the user may share the files, and other types of counts related to the file sharing.

E. Other Types of Tracking

Tracking system 150 may also be configured to track the resources and services that have not been yet described. For example, tracking system 150 may be configured to track an image processing of scan data. This type of tracking may involve tracking a count of pages that a user requested to have processed by the image-processing application. Furthermore, the tracking may involve tracking a type and size of scan data that the user processed using a particular word-processing application, or tracking other types of information related to providing various services to the user.

IV. Distributed Scan Management System

In an embodiment, the approach for tracking a usage of resources and services is implemented in a distributed scan management (DSM) system. A DSM system may be installed on a dedicated terminal, such as an administrator terminal 110, depicted in FIG. 1, or other devices, such as a scan server.

A DSM system may be configured to detect and manage scanning devices in a computer network, and may do so using a specialized Scan Management Console (SMC). An example of the SMC is depicted in FIG. 1. An SMC is usually configured to support Web Services for Devices (WSD), and allows network devices to advertise their functionalities and services to clients.

A DSM system may be configured to maintain and use authentication certificates. An authentication certificate may be used for establishing and maintaining secure connections between scanning devices and user machines. A certificate may be issued from an internal certificate authority, a public certificate authority or it can be a self-signed certificate.

A DSM system may use various scan process definitions containing instructions for acquiring image data. A scan process definition may also include user access right data for a user or a group of users who are allowed to use the scan process definition when requesting scan data. A scan process definition may also include destination data that identifies one or more destinations at which the generated scan data is to be stored.

V. Administrator Terminal

Figure 4:
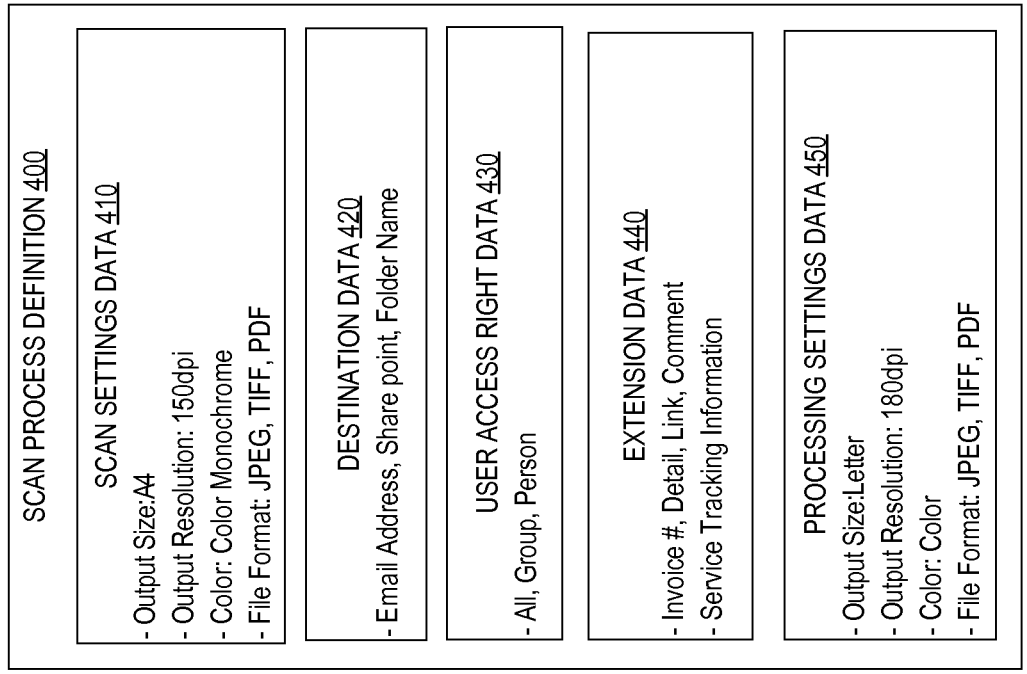
FIG. 4 is a block diagram that depicts an example overview of contents of a scan process definition, according to an embodiment.

A DSM system may be equipped with an administrator terminal configured and used to detect and monitor network scanners, and to create and manage generating scan data and post-scan processing of the scan data. An administrator terminal may also be configured to allow a user or an administrator to define, modify and store scan process definitions. Scan process definitions are depicted in FIG. 4.

An example of an administrator terminal 110 is depicted in FIG. 1. An administrator terminal may be configured with an SMC 112. SMC 112 may be implemented in software, hardware, or any combination of software and hardware.

In an embodiment, SMC 112 is a part of the Microsoft Management Console (MMC) Windows Server technology. In an embodiment, SMC 112 implements a standard protocol to communicate with scan device 130. A non-limiting example of a standard protocol is the Distributed Scan Device Web Service (WS-DSD) protocol. This protocol uses a subset of the XML schema elements defined in the WS Scan Service specification.

A. Generating Scan Process Definitions

A scan process definition defines a set of instructions for acquiring image data, generating scan data, storing the scan data, post-scan processing of the scan data, and storing the processed scan data. A scan process definition may be used to code one or more scan operations to be performed with respect to one or more printed documents, and describes the type of resources and processing that may be performed on the scan data.

B. Example Scan Process Definition

FIG. 4 is a block diagram that depicts an example overview of contents of a scan process definition 400, according to an embodiment. In an embodiment, scan process definition 400 includes scan settings data 410, destination data 420, user access right data 430, and extension data 440. In other embodiments, scan process definition 400 may include other data, depending upon a particular implementation. For example, scan process definition 400 may include scan device indicator data, authorization credentials, and the like.

Scan settings data 410 may indicate one or more image-acquisition settings to be used by a scan device 130 to generate scan data. For example, scan settings data 410 may indicate to scan device 130 how to generate scan data from one or more printed documents. In particular, scan settings data 410 may include information about a page size of the output scan data, an output resolution of the output image data, an indication of the color scheme, such as a monochromatic scheme or a color scheme, an indicator of the output file data format, such as JPEG, TIFF, PDF, and the like. A scan process definition 400 depicted in FIG. 4 may be transmitted to scan device 130 and, based on the received definition, scan device 130 may determine the manner in which the scan data is to be generated.

Destination data 420 may indicate one or more destinations for scan data. The destination data 420 may be used to determine a destination to which the scan data may be transmitted for storing, and from which, the scan data may be retrieved later on for further processing.

Destination data 420 may include a single destination to which scan device 130 may transmit scan data. Alternatively, destination data 420 may indicate multiple destinations, some of which include those depicted in FIG. 4. For example, the destination data 420 may include an email address, a share point at which the scan data may be stored, a folder name, and the like.

User access right data 430 may indicate a privilege scheme for accessing a particular scan process definition. For example, user access right data 430 may indicate whether a user submitting a request for accessing a scan process definition 400 may be granted the access.

Alternatively, user access right data 430 may indicate a user, a group of users or an organization of users who are allowed to use a scan process definition 400. For example, if user access right data 430 indicates "All," then every user who submits a request to access the scan process definition 400 may be granted the access, and any indication of groups or individuals in user access right data 430 may be ignored. However, if user access right data 430 indicates {used, user 2, group3}, and group3 comprises {used, user4, and user5}, then users 1-2 and 4-5 may be granted the access, while every other user may be denied the access.

User access right data 430 may also be used to provide security to scan data generated by a scan device. For example, user access right data 430 may indicate users, group of users and the like who may be allowed to request generating scan data from a particular scan device, or who may be granted access to the generated scan data. For example, user access right data 430 may contain information indicating that {user 1, user 2} may be allowed to request generating scan data from a scan device 130, and that {user 1, user 3} may be granted access to the generated scan data.

User access right data 430 may also contain restrictions associated with the scan process definition. For example, the restrictions may pertain to restricting a usage of a particular scan process definition, or restricting destinations to which the scan data may be transmitted.

Extension data 440 may be used by a scan device to determine the information to be stored in association with scan data. For example, extension data 440 may include an invoice number for the invoice to be generated as the scan data is generated. The extension data 440 may also include detailed information related to for example, post-scan-processing of the scan data, a hyperlink to the location, at which additional information is stored. The additional information may pertain to for example, the type of the post-scan processing, comments related to the post-scan processing, and the like.

Processing settings data 450 may include information indicating the type of post-scan-processing to be performed on scan data. For example, processing settings data 450 may indicate an output page size of the document to which the processed scan data is to be stored, an output resolution of the document to which the processed image data is to be stored, an indication of the color scheme, such as a monochromatic scheme or a color scheme, an indicator of the output file data format, such as JPEG, TIFF, PDF, and the like. Upon transmitting the processing settings data 450 to external network services of FIG. 2, the server providing a particular service may determine the manner in which the scan data is to be processed.

C. Example Post-Scan Processing Definition Containing Usage Tracking Instructions A DSM system may implement a usage tracking in a variety of ways. In an embodiment, tracking instructions may be embedded in a scan process definition 400 stored at and available from scan process definition server 120. In other embodiment, tracking instructions may be provided in documents, such as XML documents referenced from a scan process definition 400.

In an embodiment, tracking instructions for a usage tracking are embedded in a post-scan processing definition stored in a scan process definition server 120. The tracking instructions may be represented in a form of an extension or a plug-in to an already existing post-scan processing code, or may be represented in a form of a code program executed upon receiving a call when a post-scan processing definition is invoked.

FIG. 5 depicts example of post-scan processing code 500 that includes usage tracking instructions 550-560, according to an embodiment. Post-scan processing code 500 may be included in a scan process definition 400, or linked from the scan process definition 400. In the depicted example, post-scan processing code 500 is represented as an XML document, and comprises a header section 520, a scan ticket section 530, and a post-scan processing instructions section 540. The header section 520 comprises hyperlinks to the programming environment for invoking a scan process definition 400, which is depicted in FIG. 4. The scan ticket section 530 provides instructions for executing a scan job, and may correspond to scan settings data 410 of scan process definition 400. The post-scan instructions section 540 provides instructions for post-scan processing of the scan data, and may correspond to processing settings data 450 of a scan process definition 400.

Post-scan processing instructions section 540 may include instructions for tracking a usage of resources and services in a DSM system. The instructions may be provided as code instructions represented using XML, or represented in other programming language.

In an embodiment, instructions for tracking a usage of resources and services include encoded instructions. The encoded instructions may indicate whether the tracking is enabled, and indicate an IP address of a server on which a service usage tracking system is configured to perform the usage tracking.

In the example depicted in FIG. 5, the code indicating whether the tracking is enabled is represented using the delimiter "ihv:service-tracking", and is represented as:

<ihv:service-tracking>true</ihv:service-tracking> wherein, the term "true" indicates that a usage tracking is enabled in the particular post-scan processing code 500.

Furthermore, the code indicating an IP address of a server on which a service usage tracking system is configured is represented using the delimiter "ihv:service-tracking-url" and an URL address:

<ihv:service-tracking-url>192.123.3.2:800</ihv:service-tracking-url>.

wherein, the URL address of "192.123.3.2:800" is an example of an URL address of a particular server that is configured to perform the usage tracking for the jobs managed using the particular scan process definition.

FIG. 5 depicts one of many ways of embedding tracking instructions in scan process definitions. In other approaches (not depicted in FIG. 5), the tracking instructions may be included in a separate data structure linked from a scan process definition, and downloaded from a shared memory or a storage device when a particular scan process is invoked.

VI. Scan Process Definition Server

A scan process definition server, also referred to as a definition server 120, is a computing device that comprises one or more processors and one or more storage media for storing instructions which, when processed by the processors, enable creating, storing, modifying and retrieving scan process definitions.

A. Storing Scan Process Definitions

Definition server 120 may be configured to store scan process definitions. Scan process definitions are described in detail in FIG. 4. Definition server 120 may store scan process definition data locally with respect to definition server 120, as depicted in FIG. 1, or remotely to definition server 120.

Definition server 120 may also store scan process identification data that corresponds to and identifies one or more scan process definitions. For example, for a particular scan process definition, definition server 120 may store a particular identifier that uniquely identifies the particular scan process definition. Hence, if the particular scan process definition is requested from definition server 120, definition server 120 may return the data containing the particular scan process definition if definition server 120 receives the particular identifier.

B. Processing Request for Scan Process Definitions

Definition server 120 may be configured to process requests for scan process definitions. For example, definition server 120 may be configured to respond to requests, received from SMC 112, for retrieving and providing data containing scan process definitions, and for storing the modified data containing the modified scan process definitions. For example, if an administrator at administrator terminal 110 desires to change a storage location for scan data that is to be generated based on a particular scan process definition, then the administrator may cause SMC 112 to send a request to definition server 120 for data containing the particular scan process definition. The request may contain a particular identifier, which uniquely identifies the particular scan process definition. In response, the data containing the particular scan process definition may be sent to SMC 112, and displayed for the administrator. Through SMC 112, the administrator may change the destination data indicated in the particular scan process definition to indicate a new storage location. The new storage location may be represented by an email address or a network folder that was not indicated before in the particular scan process definition. Upon completing the modifications to the particular scan process definition, the administrator may request that the modified data, containing the modified scan process definition, be transmitted to definition server 120 for storing.

Definition server 120 may be configured to support versioning of the scan process definitions. For example, definition server 120 may be configured to maintain a current version and one or more previous versions of a particular scan process definition. Each version of the particular scan process definition may be identifiable by a unique identifier. An administrator may request a particular version of the particular scan process definition by providing to definition server 120 a unique identifier identifying the particular version, and in response, receive data including the particular scan process definition. Alternatively, an administrator may provide a list of identifiers associated with different versions of the same scan process definition or associated with different scan process definitions, and in response, receive the requested data.

Definition server 120 may also be configured to respond to requests, received from scan devices, for providing scan process definitions. A request from a scan device may include an identifier of a requested scan process definition. The identifier may also include identification data and authentication data, such as a username and password of a user for whom the request is made. The username and password may be provided using a keyboard integrated with a scan device 130.

In response to receiving the authentication data of a user, definition server 120 may determine one or more scan process definitions that are associated with the authentication data. For example, definition server 120 may determine one or more scan process definitions that are associated with the authentication data, and thus that the user may request. In addition, definition server 120 may determine, based on the authentication data, whether the user is associated with any groups. If so, definition server 120 may identify one or more groups and scan process definitions that are associated with each group of the identified groups and that the user may request as well.

In response to identifying one or more scan process definitions based on a request from scan device 130, definition server 120 may provide scan process definition identification data to scan device 130. The scan process definition identification data may identify one or more scan process definitions. The scan process definition identification data for a scan process definition may be represented by an identifier. The identifier may be provided to scan device 130 and displayed on a display of scan device 130 for a user.

Upon displaying for a user one or more objects, representing one or more identifiers of the scan process definitions available to the user, scan device 130 may allow the user to select a scan process definition identifier from the displayed scan process definition identifiers. The selection is provided to scan device 130 in a form of user input. In response to receiving the user input, which indicates a selection of a particular scan process definition identifier, scan device 130 sends, to definition server 120, selection data that identifies the scan process definition that the user selected. In response, definition server 120 sends data containing the selected scan process definition to scan device 130.

VII. Scan Device

Scan device 130 is a computing device that is configured to process scan jobs. A scan job may involve a request for generating scan data based on one or more scan settings. Scan settings may be indicated in the scan settings data of a scan process definition retrieved from definition server 120. Scan device 130 may include one or more hardware, firmware and software elements that allow scan device 130 to perform functions, such as receiving user input, communicating with definition server 120, performing scan operations, communicating with scan server 140, and storing data in one or more storage devices.

Scan device 130 may also be configured to provide functionalities other than generating scan data. For example, scan device 130 may be a multi-function peripheral (MFP) device configured to provide additional capabilities, such as printing, faxing, archiving, and the like.

In an embodiment, scan device 130 uses a standard protocol to communicate with other devices, including scan server 140. An example of the standard protocol is the Distributed Scan Processing Web Service protocol. This protocol uses the XML schema described in the Distributed Scan Processing Web Service Schema.

A. Processing Scan Jobs

Scan device 130 may include an interface that allows a user to initiate a scan job. The interface may comprise a display screen for displaying data, and display selectable buttons for initiating a scan job. Scan device 130 may include other buttons, including physical buttons and buttons represented graphically.

Scan device 130 may be configured to request user authentication data from a user before the user is allowed to initiate a scan operation at scan device 130. For example, scan device 130 may have an attached badge reader or quick response (QR) code reader that is capable of reading authentication data from a badge of a user. Alternatively, scan device 130 may query a user to enter authentication data via a user interface of the scan device. The data may be sent to definition server 120 in order to authenticate the user.

Upon a successful authentication of the user, scan device 130 may retrieve identifiers of one or more scan process definitions from a scan process definitions server 120, and display one or more objects or icons associated with the retrieved scan process definition identifiers. The user may select a particular identifier from the displayed identifiers, thus selecting a particular identifier associated with a particular scan process definition. Scan device 130 may transmit data representing the selected identifier to scan process definition server 120, and request data representing the corresponding scan process definition from scan process definition server 120. If scan process definition server 120 determines that the user is allowed to request the selected scan process definition, then data representing the selected scan process definition is transmitted to scan device 130, and subsequently represented on a display of scan device 130 for the user. However, if the user is not allowed to request the selected scan process definition, then scan process definition server 120 may notify scan device 130 of the error in the request, and, optionally, scan device 130 may generate and display an appropriate message for the user.

As depicted in FIG. 4, a scan process definition 400 may include various types of information. The information may include scan settings data 410, which specifies one or more scan settings to be used by scan device 130 to generate scan data for a user. The scan process definition may also include processing settings data 450, which specifies the processing to be performed on the scan data by a plurality of network services. Furthermore, the scan process definition may also include extension data 440, which may include an invoice number, and the like.

As depicted in FIG. 5, a scan process definition 500 may also include service tracking information, which may indicate whether service tracking is to be used when scan data is generated the scan process definition and which may indicate an IP address of the server configured to collect and process usage tracking data.

Upon receiving data including a scan process definition data, scan device extracts scan settings data from the definition, and uses scan settings included in the scan settings data in generating scan data. The scan data generated by scan device 130 may include one or more image files. An image file may be represented in any data image format, such as JPEG, TIFF, or PDF.

Once generating scan data is completed, scan device 130 may send the scan data to scan server 140, or other destination. A destination for the scan data may be determined based on destination data included in the scan settings data. The destination data may identify scan server 140, or may simply be an indication that the scan data is to be processed within system 100. The destination data may be indicated in the scan process definition that was used to create the scan data or may be specified by a user at scan device 130.

In addition to scan data, scan device 130 may also send other data to scan server 140. Such data may include scan process settings data, and metadata generated by scan device 130.

B. Generating Metadata and Service Tracking Information

Scan device 130 may be configured to track a usage of resources employed in generating scan data. Scan device 130 may determine whether to track the usage using a variety of approaches. For example, scan device 130 may determine whether tracking instructions are included in a scan process definition used in generating the scan data. As depicted in FIG. 5, tracking instructions may include an indication whether the tracking is enabled, and may include an IP address of the server configured to host a service usage tracking system. The tracking instructions are also referred to as service tracking information Service tracking information may specify whether service tracking is to be used in generating scan data, and specifies various parameters related to the tracking. For example, the service tracking information may include an IP address of the server configured to host a service usage tracking system. Furthermore, the service tracking information may indicate the types of scan jobs and the types of post-scan-processing that are to be tracked for a particular user. In addition, or in alternative, the service tracking information may include information indicating the type of scan jobs and the types of post-scan processing that are not to be tracked for a particular user.

In an embodiment, using service tracking information, scan device 130 determines whether generating scan data is to be tracked for a user. For example, if a user selected a particular scan process definition and the particular definition contains instructions indicating that the tracking is to be enabled, then, as scan device 130 generates scan data, scan device 130 may also generate metadata useful for the purpose of the usage tracking.

In an embodiment, scan device 130 generates metadata that includes at least a portion of scan settings data extracted from a scan process definition. For example, the metadata may include the scan settings data indicating a count of electronic files to be generated from a printed document. The metadata may be then transmitted directly or indirectly (via a scan server) to service usage tracking system 150, and used by service usage tracking system 150 to track a usage of the scanning devices by the user.

C. Using Metadata and Tracking Information to Track A Usage of Resources and Services Scan device 130 may transmit scan data, metadata, processing settings data, and service tracking information to a scan server 140 for processing, and cause scan server 140 to generate service tracking data. The service tracking data may include at least a portion of the metadata and may specify the type of post-scan processing of the scan data. For example, scan server 140 may process the service tracking data and transmit the processed service tracking data to service usage tracking system 150 for further processing. The processing performed by service usage tracking system 150 may include generating specific values from the service tracking data, and using the generated values to update a usage tracking record maintained for a user. An example of the usage tracking record is depicted in FIG. 3.

VIII. Scan Server

Scan server 140 is a computing device that comprises one or more processors and storage media that stores instructions which, when processed by the processors, cause performance of scanning and post-scan processing related functions. For example, scan server 140 may be configured to receive scan data and instructions for post-scan processing of the scan data, transmit the scan data and the instructions to one or more servers configured to perform the post-scan processing, receive and store the post-scan-processed data, generate service tracking data representing the post-scan processing, and transmit the service tracking data to a service usage tracking system. Scan server 140 may be configured to communicate with other scan servers, one or more scan devices 130, one or more administrator terminals 110, one or more scan process definition servers 120, one or more service usage tracking systems 150, and one or more external network services 160.

A. Storing Scan Data

Scan server 140 may be configured to receive scan data from scan device 130, and cause the scan data to be stored according to destination information specified in a scan process definition. The destination information may indicate a location and the manner for storing the scan data, and may be conveyed in a variety of ways. For example, the destination information may be supplied by a user using an interface configured on scan device 130, or may be included in a scan process definition retrieved from definition server 120. The destination data may include one or more email addresses to which the scan data is to be sent, or one or more data folders, in which the scan data is to be stored. For example, a destination for storing the scan data may be determined when a user enters a personal email address to which the scan data is to be sent. According to another example, a destination may be determined based on scan process definition 400 that a user selected while initiating the scan job, and that includes one or more email addresses, a name of a network folder, share point location, and the like, to which the scan data is to be sent.

Alternatively, scan server 140 may be configured to store scan data in a predetermined location. This approach may be used if the destination information is missing in a scan process definition, or if a DSM system is configured to use the same location for storing all scan data generated for certain users or certain groups of users. Such an approach may be used for storing scan data generated for users who work on a particular project or assignment.

In an embodiment, prior to causing scan data to be stored at a particular location, scan server 140 may validate credentials supplied by a user to determine whether a user is authorized to have the scan data stored at the particular location. Validation may involve checking user access rights of the user. A definition of the user access rights may be included in a scan process definition 400, and may contain identifiers of the users or groups of users who are authorized to store the scan data at the particular location. Validation may involve sending, from scan server 140, the scan server definition to a definition server 120, and having the definition server 120 provide a response indicating whether the scan data may be stored at the particular location. For example, the definition server 120 may use the scan server definition to determine whether the particular user has the "write" privileges with respect to the particular location.

B. Initiating Post-Scan Processing

Scan server 140 may be configured to direct scan data to one or more external servers for further processing. For example, scan server 140 may transmit the scan data to an external server configured to perform an OCR-based processing of the scan data, or to another server configured to perform an image-based processing of the scan data. Examples of various types of processing provided by external network services are depicted in FIG. 2.

Post-scan processing of scan data may be encoded in a scan process definition 400 depicted in FIG. 4. In an embodiment, a particular type of processing may be determined based on processing settings data 450 of the scan process definition 400. The particular type of processing may include an OCR-based processing, resulting in generating an output document having a particular output size (letter), a particular output resolution, and the like. According to another example, the particular type of processing may include an image-processing, resulting in generating an output document having a particular resolution of 180 dpi, and having a particular color scheme.

A server configured to provide a particular type of services or post-scan processing may be determined based on destination data included in a scan process definition 400. For example, destination data may include one or more IP addresses or hyperlinks of one or more locations of servers configured to provide external network services. The servers configured to provide external network services may include third party services, cloud-base services, and the like.

C. Generating Service Tracking Data

In an embodiment, scan server 140 maintains an event log that logs information regarding different scan jobs and post-scan processing of scan data. The log information may be used to track a usage of the resources and services.

An event log may store, for each scan job, data that indicates a scan device that generated scan data, status of the scan data generation, an identifier of the scan process definition used in generating the scan data, a location at which the generated scan data was stored, and an indicator of the user who requested the job. Furthermore, if an error occurred when the scan data was generated, then the event log may store an indicator of the error message or the detected error. Moreover, the event log may store information specific to the scan job, such as a count of the generated pages, a total size of the scan data, and specific scan settings used to generate the scan data. In addition, the event log may store information specific to the processing of the scan data. Such information may include a count of the processed pages, a type of the processing, a size of the generated output file, and the like. The event log may be stored on the same device that executes the scan server or on a separate device.

Scan server 140 may also be configured to track a usage of resources employed in generating scan data and to track a usage of services performed on the scan data. To determine parameters for tracking the usage, scan server 140 may use the information collected at scan server 140, including the log information, and the information received from scan device 130. The information received from scan device 130 may include the generated scan data, generated metadata, processing settings data extracted from scan process definition 400, and service tracking information extracted from scan process definition 400. The service tracking information may specify whether service tracking was used when the scan data was generated, and may specify various parameters related to the tracking. For example, the service tracking information may include information indicating the types of scan jobs and the types of post-scan-processing to be tracked for a particular user, and the type of scan jobs and the types of post-scan processing not to be tracked for a particular user.

In an embodiment, based on data received from scan device 130, scan server 140 determines the type of processing that is to be tracked for a user. For example, if scan server 140 received an indication that, in a particular scan process definition selected by the user, the usage tracking is enabled (as depicted in FIG. 5, element 550), then various counts and parameters associated with the performing the scanning and post-scan processing may be tracked and provided to a service usage tracking system 150. Thus, if a user selected a particular scan process definition, and requested a scan job and an OCR-based processing, then a count of pages of scan data and a count of pages generated using the OCR-based processing may be tracked. Scan device 130 may then generate data containing the tracked data and send the tracked data to a service usage tracking system 150.

D. Using Service Tracking Data to Track A Usage of Resources and Services

Scan server 140 may use service tracking information, metadata and other information to generate service tracking data. The service tracking data may include at least a portion of the metadata and may specify the type of processing to be performed by a plurality of network services on the scan data. For example, scan server 140 may process the service tracking data and transmit the processed service tracking data to service usage tracking system 150 for further processing. The processing performed by service usage tracking system 150 may include generating specific values from the service tracking data, and using the generated values to update a usage tracking record maintained for a user. An example of a usage tracking record is depicted in FIG. 3.

IX. Usage Tracking

Tracking of a usage may involve tracking of the usage of resources configured to generate scan data and tracking of the usage of services configured to perform post-scan processing of the scan data. The tracking may be customized for individual users, groups of users, organizations of users and other entities including users. The instructions for performing the tracking may be provided by a system administration and may be embedded in a data structure, such as a scan process definition 400 of FIG. 4. For example, the tracking instructions may specify whether the resources and services are to be tracked, and may specify a location of a service usage tracking system configured to perform the tracking. The tracking instructions may be embedded an XML document included in or linked from a scan process definition 400.

In an embodiment, tracking instructions may be embedded in a post-scan processing code that is included in or linked from a scan process definition. An example of the tracking instructions embedded in a post-scan processing code represented as an XML document is depicted in FIG. 5. The tracking instructions may be executed when a user selects the scan process definition comprising the tracking instructions.

Approaches for tracking of the usage of resources and services available to the user may be implemented in scan devices, scan servers and usage tracking servers. The usage tracking information and data may be transmitted between the scan devices, scan servers and usage tracking server and each of the devices may contribute to the processing. For example, each device may perform certain steps of the usage tracking approach, and communicate the results to other devices.

Figure 6:
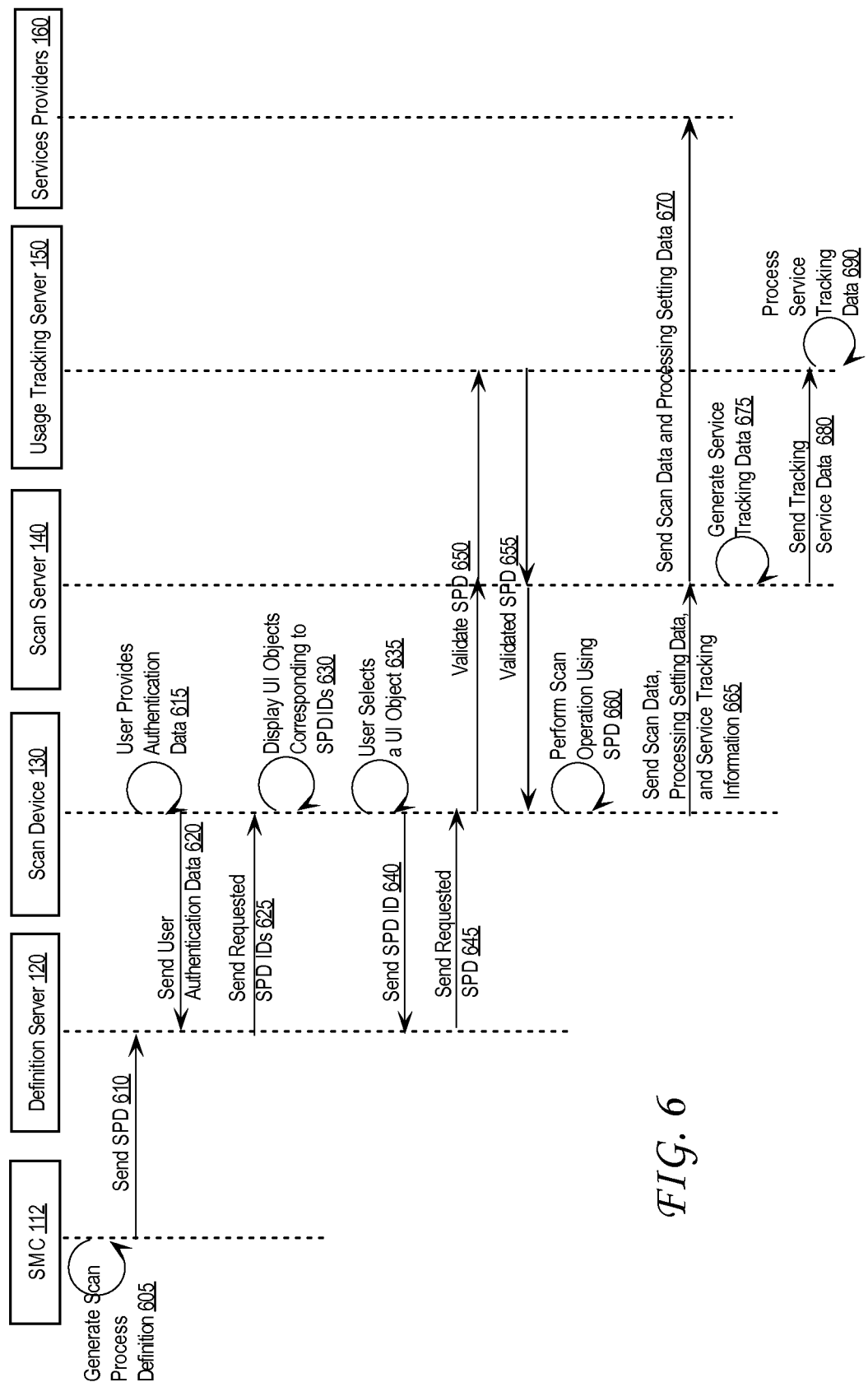
FIG. 6 is a sequence diagram that depicts a process for a usage tracking in a distributed scan management system, according to an embodiment.

FIG. 6 is a sequence diagram that depicts a process 600 for a usage tracking in a DSM system, according to an embodiment. In step 605, an administrator uses SMC 112 to generate one or more scan process definitions. A scan process definition may include various types of information related to generating scan data and post-scan processing of the scan data. A scan process definition may also include tracking instructions for performing a usage tracking of the resources and services. An example of a scan process definition is depicted in FIG. 4.

In an embodiment, a scan process definition may include scan settings data that specifies one or more scan settings to be used by a scan device to generate scan data. A scan process definition may also include processing settings data that specifies processing to be performed on the scan data by a plurality of network services. A scan process definition may also include service tracking information indicating whether a usage tracking is to be performed, and tracking instructions specifying for example, a location of a service usage tracking system configured to collect and process tracking data. The service tracking information may also specify the type of information that is to be tracked for billing and accounting purposes.

In step 610, the scan process definition is transmitted to a definition server 120. Definition server 120 may store the received scan process definition in a local or remote storage accessible to definition server 120.

In step 615, a user provides authentication credentials to scan device 130. The authentication credentials may include a user identifier and a user password, and may be provided to scan device 130 manually, or using any type of a magnetic or optical reading device. For example, the credential may be encoded using a QR code, and read from a card on which the QR code is imprinted.

In step 620, scan device 130 sends the user's authentication data to definition server 120. Based on the user's authentication data, definition server 120 may determine one or more scan process definitions that are associated with the user's authentication data.

In step 625, definition server 120 sends scan process identification data, indicating the one or more scan process definitions, to scan device 130. The scan process identification data identifies the one or more scan process definitions that were determined by definition server 120 based on the user' authentication data. The scan process identification data may include, for example, identifiers of icon objects or labels that were specified by an administrator and that are associated with the respective scan process definitions.

In step 630, scan device 130 causes generating a display of one or more user interface objects on a display screen of scan device 130. Each user interface object corresponds to a scan process definition that is identified by the scan process identification data. A user interface object may be implemented as, for example, a graphical button or a menu option in a list of menu options.

In step 635, a user selects, from one or more user interface objects, a particular user interface object, corresponding to a particular scan process definition. The user interface objects may be represented as graphical buttons that are displayed on a display screen of scan device 130, or may be represented as physical buttons that are adjacent to the display screen. Selecting a particular user interface object, corresponding to a particular scan process definition, may involve selecting a button that is associated with an identifier associated with the particular scan process definition.

In step 640, scan device 130 sends the selected scan process identifier to definition server 120.

In step 645, definition server 120 sends, to scan device 130, data including the scan process definition that is identified by the selected scan process identifier.

In an embodiment, an authenticated user is allowed to modify one or more portions of the selected scan process definition. For example, an authenticated user may change one or more of the scan settings in the scan settings data of the scan process definition. The user may also modify a designation of the scan server that is to generate scan data. According to another example, an authenticated user may change one or more post-scan instructions pertaining to post-scan processing of the scan data. Furthermore, an authenticated user with for example, privileges of an administrator, may modify usage tracking instructions embedded in the scan process definition.

Steps 650-655 are optional. In step 650, scan device 130 transmits scan process definition data to scan server 140, and causes scan server 140 to validate the scan process definition for the user. Scan device 130 may also cause scan server 140 to transmit the scan process definition data to service usage tracking system 150 for validation. Alternatively, scan device 130 may transmit the scan process definition data directly to service usage tracking system 150, and cause service usage tracking system 150 to validate the scan process definition for the user.

Validation may include determining whether the user is indeed allowed to select a particular scan process definition. For example, in situations when the data stored in definition server 120 is not completely synchronized with the data available to tracking system 150, definition server 120 may allow a user to select a particular scan process definition even though according to tracking system 150, the particular scan process definition is unavailable to the user. However, if service usage tracking system 150 validates the selected scan process definition, then service usage tracking system 150 transmits a validation message 655 to scan server 140, or directly to scan device 130.

Validation may also include determining whether service usage tracking system 150 can verify that a user may use the resources and services of a DSM system. If service usage tracking system 150 verifies that the user is privileged to use the resources and services of the DSM system, then service usage tracking system 150 transmits a validation message 655 to scan server 140, or directly to scan device 130. However, if service usage tracking system 150 determines that the user does not have sufficient privileges to use the resources and services of the DSM system, then service usage tracking system 150 may transmit an error pop-up message to scan device 130, and cause scan device 130 to display the error message on the interface of scan device 130.

In step 660, scan device 130 generates scan data for the user. Scan device 130 may generate the scan data by performing a scan operation using one or more of the scan settings indicated in the scan process definition. The scan settings may be represented by scan settings data 410, depicted in FIG. 4. The scan settings data may indicate for example, a count of pages to be scanned, a file format in which the scan data is to be represented, and the like.

In step 665, scan device 130 transmits the scan data, processing setting data and service tracking information to scan server 140. The scan data may include one or more scan images, documents or files. Scan server 140 may be selected based on destination data included in the scan process definition. For example, if the destination data includes one or more email addresses of the recipients of the scan data, then scan server 140 may transmit the scan data to the email addresses of the recipients.

Scan device 130 may also send, to scan server 140, any post-scan instructions indicated in the scan process definition. For example, scan device 130 may send destination data that identifies one or more destinations to which scan server 140 is to send the scan data. Scan device 130 may also send processing settings data that identifies one or more types of post-scan processing to be performed on the scan data. Such processing may include an OCR-based processing of the scan data to generate text data, such as for example, a Word document. According to another example, the post-scan processing may include image processing of the scan data to generate image data represented in a particular image data format, such as for example, a TIFF format. According to other example, the post-scan processing may include encrypting the scan data and transmitting the scan data to share point storage for storing.

In an embodiment, in step 670, scan device 130 transmits the scan data to scan server 140 to cause scan server 140 to identify the type of post-scan processing of the scan data and to transmit the scan data to external network services 160. Scan device 130 may also provide additional information, such as instructions on how to process the scan data. For example, scan device 130 may transmit, to scan server 140, processing settings data extracted from the scan process definition 400 of FIG. 4. Scan server 140 may use the processing settings data to determine the type of the post-scan processing and a third-party server hosting a particular external application configured to perform the post-scan processing of the scan data.

The type of post-scan processing of scan data may be determined based on processing settings data transmitted to scan server 140. Examples of various post-scan processing services are depicted in FIG. 2. One of the examples includes an OCR-based processing of the scan data.

Upon receiving processing settings data and the scan data, scan server 140 may instruct a particular server to perform the specified post-scan processing of the scan data.

In step 675, scan server 140 generates service tracking data. The service tracking data may be generated based on various types of information, including the information received from scan device 130. For example, scan server 140 may generate the service tracking data based on scan data, processing settings data and service tracking information that scan server 140 received from scan device 130 in step 665.

In an embodiment, the metadata received by scan server 140 includes at least a portion of the scan settings data. The metadata may include information about a count of pages of the scan data, a data format of the scan data, and the like. That information may be used to track a usage of the scanning resources by the user. The metadata may also identify a name (or identifier) of a user who requested the scanning, and other information useful in tracking the usage of resources and services.

In an embodiment, the processing settings data received by scan server 140 includes information about the type of post-scan processing to be performed on the scan data, a count of pages to be generated by performing the post-scan processing of the scan data, a data format of the data file generated by performing the post-scan processing, and the like. That information may be used to track a usage of the external network services by the user.

In an embodiment, the service tracking information received by scan server 140 includes service tracking instructions specifying whether the usage tracking is to be performed for the user. An example of service tracking instructions 560-570 are depicted in FIG. 5. For example, the service tracking instructions 560 may indicate whether the usage tracking is enabled for the user, and the service tracking instructions 570 may indicate an IP address of tracking system 150 that is configured to collect and process the usage tracking information.

In step 675, scan server 140 generates service tracking data. Service tracking data may be generated by processing the service tracking information received by scan server 140 from scan device 130, or other devices in a DSM system. The service tracking data may include metadata received from scan device 130, and counts of various parameters associated with generating the scan data and performing post-scan processing on the scan data.

In step 680, scan server 140 transmits the service tracking data and additional information to service usage tracking system 150 for processing.

In step 690, service usage tracking system 150 processes the service tracking data received from scan server 140. The tracking may involve determining, from the service tracking data, various types of information pertaining to a request for generating scan data, as well as indicating any specific scan-related settings requested by a user. The tracking may also involve determining various types of information pertaining to post-scan processing performed on the scan data. The determined information may be stored in a data structure, such as a usage tracking record 300 depicted in FIG. 3.

In an embodiment, a usage tracking may involve generating data for billing and accounting purposed. If the usage of resources or services is free of charge, then the usage tracking may include generating summary information about the resources/services usage. For example, if a user may request a scanning of documents without any specific limitations, then the usage tracking may include generating a summary of the used resources. According to another example, if a user works on a particular project and has an unlimited access to scanning, but is billed on a monthly basis, then the usage tracking may include generating an invoice for a flat monthly fee for the rendered services. According to other example, if a user is charged for each page he requests to have scanned, then the usage tracking may include generating an invoice for the total cost of scanning of the pages that he requested to have scanned.

Usage tracking may be combined with imposing one or more restrictions on the usage of the resources and services. For example, a particular user may requests scanning of no more than 500 pages per month. This type of restriction may be implemented using a scheme of quotas or limits. The quotas may be defined by managers, project leaders or system administrators. The quotas may be entered into a database associated with tracking system 150, or otherwise accessible to tracking system 150. For example, each time a user requests a scanning, the count of the pages to be scanned is determined, and the count is compared with the predetermined quota values. If the count exceeds the quota value, then system usage tracking system 150 may refuse the performance the scanning for the user. However, if the count does not exceed the quota value, then system usage tracking system 150 may merely update the usage tracking record.

A. Usage Tracking Implemented in a Scan Device

Figure 7:
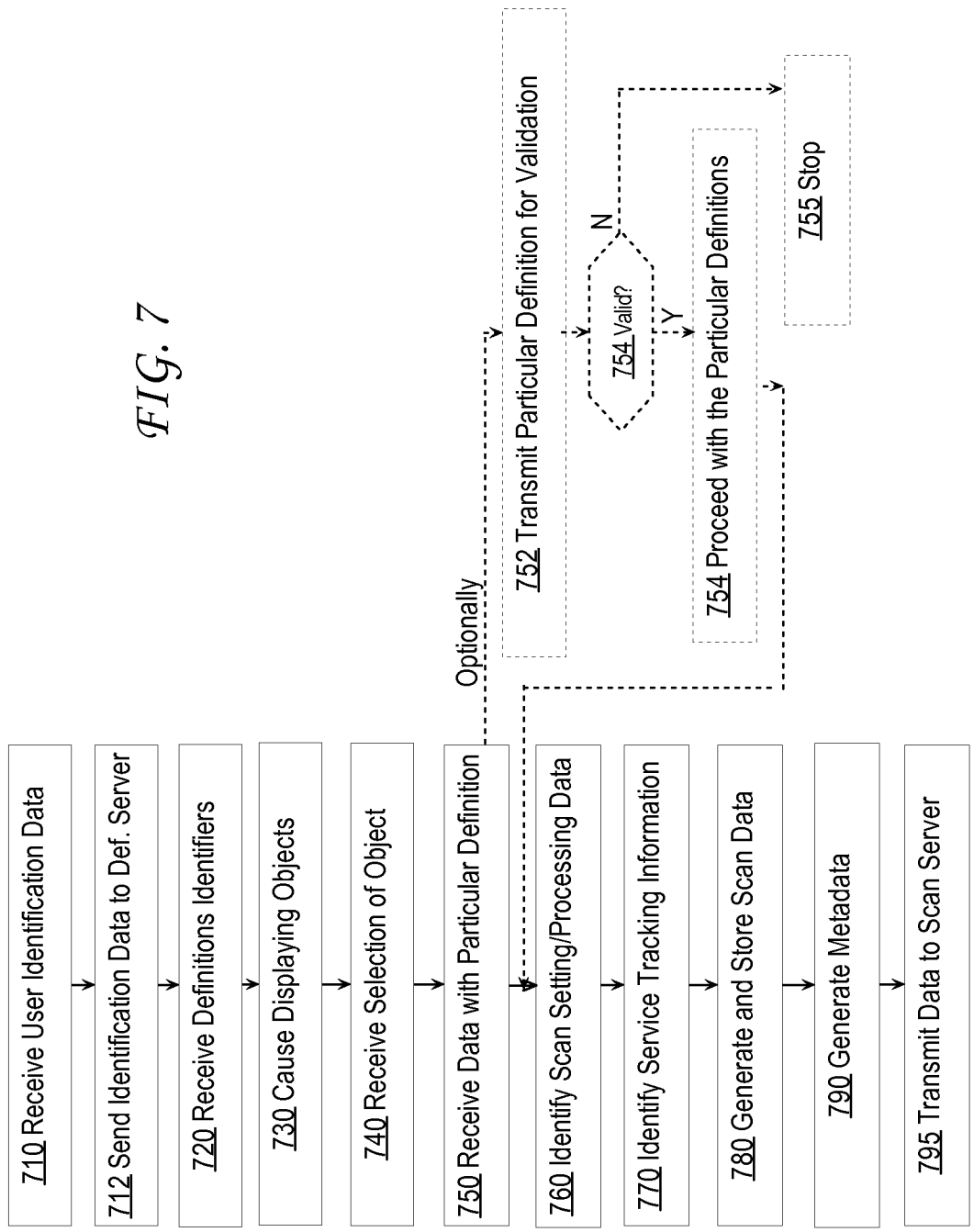
FIG. 7 is a block diagram depicting an example workflow overview for a usage tracking implemented in a scan device, according to an embodiment.

FIG. 7 is a block diagram depicting an example workflow overview for a usage tracking implemented in a scan device, according to an embodiment. In step 710, a scan device receives user identification data from a user who wishes to initiate a scan job on the scan device. The user identification data is described in step 615 of FIG. 6.

In step 712, a scan device transmits the user identification data to a definition server, causing the definition server to determine one or more scan process definitions that the user may use in performing a scan job. For example, the definition server may use the user identification data to determine a particular scan process definition that the user is allowed to invoke. Once the definition server determines the particular scan process definition, the definition server determines an identifier indicating the particular scan process definition, and sends the identifier to the scan device.

In step 720, a scan device receives one or more identifiers of the one or more scan process definitions that the user may use. The identifiers may be represented as numerical strings, alphanumerical strings, character strings, and the like.

In step 730, a scan device causes displaying one or more graphical objects, corresponding to the one or more identifiers. The graphical objects may be displayed in a user interface associated with the scan device. Various ways of displaying the objects are described in step 630 of FIG. 6.

In step 740, a scan device receives a selection of a particular object from the user. The selected object may indicate a particular identifier of a particular scan process definition that the user would like (and is allowed to) use in generating scan data and, possibly, in post-scan processing of the scan data. Various ways of selecting the particular object and determining the corresponding identifier are described in step 635 of FIG. 6.

In step 750, a scan device transmits the selected identifier to a scan process definition server and, in response, receives data including a particular scan process definition, associated with the selected identifier.

Steps 752-755 are optional. In step 752, a scan device transmits information about the particular scan process definition for validation. Validation may be performed by a service usage tracking system, or any other device configured to determine whether the user is indeed allowed to use the particular scan process definition. Examples of the validation process are described in step 650 of FIG. 6.

In step 754, the scan device receives a response from a service usage tracking system and determines whether the response indicates that the validation was successful. If the scan device determines that the validation was successful, then in step 754, the scan device proceeds to analyzing the particular scan process definition. However, if the scan device determines that the validation was unsuccessful, then in step 755, the scan device causing to display a notification message for the user, and refrains from performing a scan job for the user.

In step 760, a scan device analyzes the content of the particular scan process definition. A scan process definition may include various types of information. Examples of the types of information included in a scan process definition are depicted in FIG. 4. In an embodiment, the scan device identifies in the scan settings data, processing settings data and service tracking information. The scan settings data and processing settings data are depicted in FIG. 4. The service tracking information is depicted in FIG. 5.

In step 770, a scan device identifies service tracking information. Service tracking information may include instructions indicating whether a usage tracking is enabled in the particular scan process definition, and a location of the usage tracking server configured to collect and process the tracking information and data. An example of service tracking instructions 560-570 is depicted in FIG. 5.

In step 780, a scan device generates scan data according to the scan settings data. For example, the scan device may scan one or more hard copies of the documents, generate one or more electronic documents containing the scan data, and store the electronic documents in a temporary folder. In this step, the scan device may also determine a destination for the scan data and store the scan data at the destination. The destination may be determined based on destination data included in the scan process definition. For example, the destination data may include one or more email addresses of the recipients to whom the scan data is to be sent.

In step 790, a scan device generates metadata. Metadata may include information that may be useful in tracking the usage of scanning resources in a DSM system. For example, the metadata may include at least a portion of the scan settings data, such as a count of pages that were generated by scanning, a type of data format in which the scan data is represented, an identification of the user who requested the scanning, and the like.

In step 795, a scan device transmits the scan data, the processing settings data and the service tracking information to a scan server for processing. The processing of the tracking information by the scan server may involve generating service tracking data. Service tracking data may include at least a portion of the metadata and specify the type of processing to be performed on the scan data by external services. The processing may also involve sending the service tracking data to a server usage tracking system for further processing, which may include updating a usage tracking record depicted in FIG. 3.

B. Usage Tracking Implemented in a Scan Server

Figure 8:
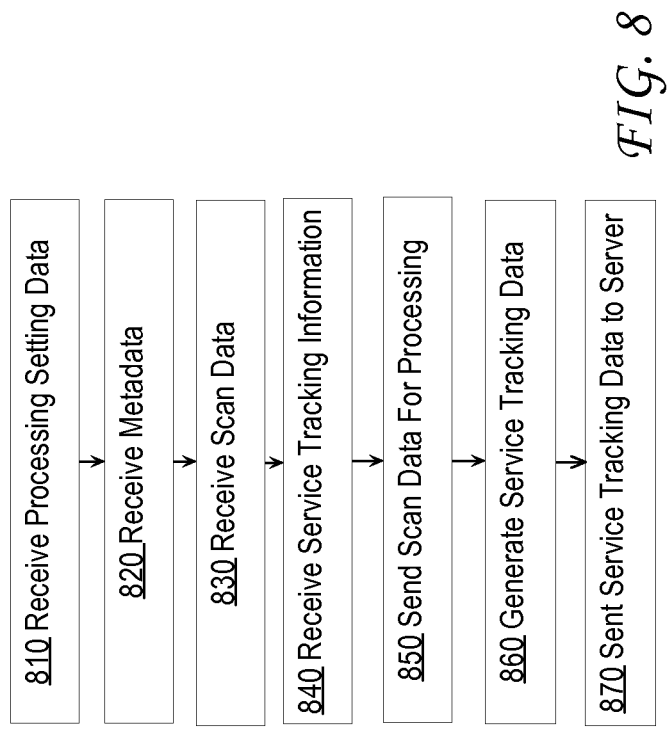
FIG. 8 is a block diagram depicting an example workflow overview for a usage tracking implemented in a scan server, according to an embodiment.

FIG. 8 is a block diagram depicting an example workflow overview for a usage tracking implemented in a scan server, according to an embodiment. In an embodiment, steps 810-840 are performed sequentially (as depicted in FIG. 8), as the individual types of data are sent from a scan device to a scan server in separate communications. In another embodiment, steps 81-840 are performed concurrently, as the individual types of data are sent from a scan device to a scan server in one communication.

In step 810, a scan server receives processing settings data from a scan device. Processing settings data may include information about the type of post-scan processing that is to be performed on scan data. For example, the processing settings data may include information indicating that the scan data is to be processed using an OCR-based processing application to generate an output Word document. According to another example, the processing settings data may include information indicating that that the scan data is to be stored in a share point storage device, and may include a URL address of the server hosting the share point storage device.

In step 820, a scan server receives metadata from a scan device. Metadata may include at least a portion of the scan settings data that the scan device identified in a scan process definition selected by a user. The metadata may include for example, a count of pages that were generated by scanning, a type of data format in which the scan data is represented, an identification of the user who requested the scanning, and the like.

In step 830, a scan device receives scan data from a scan device. Scan data may include image data of one or more hard-copies of the documents scanned by the scan device. The scan data may also include auxiliary data, such as timestamps indicating the amount of time that took to generate scan data. The scan data may also include an identifier of the user for whom the scanning was performed, and the like.

In step 840, a scan device receives service tracking information from a scan device. Service tracking information may include instructions indicating whether a usage tracking is enabled in a particular scan process definition, and a location of the usage tracking server configured to collect and process the tracking information and data. An example of service tracking instructions 560-570 is depicted in FIG. 5.

In step 860, a scan server generates service tracking data that includes at least a portion of the metadata and specifies the type of post-scan processing to be performed on the scan data by external service providers.

In step 870, a scan server transmits the service tracking data to a service usage tracking system for processing. Processing of the service tracking data by the service usage tracking system may involve updating a usage tracking record depicted in FIG. 3.

Approaches described above include various methods for tracking a usage of resources configured to generate scan data and for tracking a usage of services configured to perform post-scan processing of the scan data. The approaches may be implemented in a variety of systems, including distributed scan management systems, and may be helpful in tracking the cost associated with using the resources and services. For example, the tracking may provide cost-related data for billing and accounting purposes.

Processing of the tracking data may be performed by scan devices, scan servers and service usage tracking systems. The devices, servers and system may collaborate with each other in generating and disseminating the tracking data. The processing may include updating usage tracking records maintained for users and group of users, verifying eligibility for using the resources and services by the users and the groups, and generating cost-related information for the billing purposes.

X. Implementation Mechanisms

According to one embodiment, the approaches described herein are implemented by one or more special-purpose computing devices. The special-purpose computing devices may be hard-wired to perform the approaches, or may include digital electronic devices such as one or more application-specific integrated circuits (ASICs) or field programmable gate arrays (FPGAs) that are persistently programmed to perform the approaches, or may include one or more general purpose hardware processors programmed to perform the approaches pursuant to program instructions in firmware, memory, other storage, or a combination. Such special-purpose computing devices may also combine custom hard-wired logic, ASICs, or FPGAs with custom programming to accomplish the approaches. The special-purpose computing devices may be desktop computer systems, portable computer systems, handheld devices, networking devices or any other device that incorporates hard-wired and/or program logic to implement the approaches.

Figure 9:
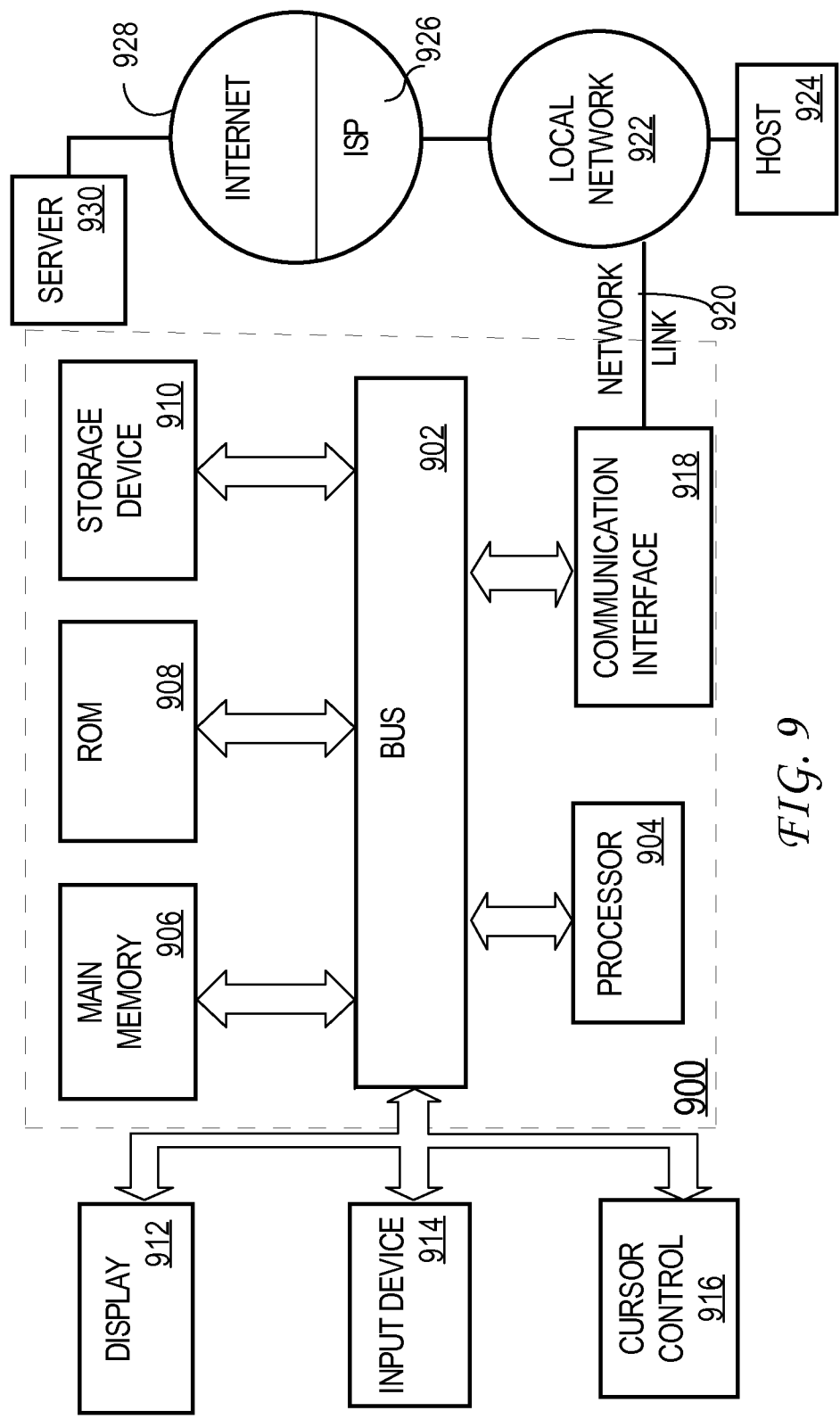
FIG. 9 is a block diagram that depicts an example computer system upon which embodiments may be implemented.

FIG. 9 is a block diagram that depicts an example computer system 900 upon which embodiments may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. Although bus 902 is illustrated as a single bus, bus 902 may comprise one or more buses. For example, bus 902 may include without limitation a control bus by which processor 904 controls other devices within computer system 900, an address bus by which processor 904 specifies memory locations of instructions for execution, or any other type of bus for transferring data or signals between components of computer system 900.

An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the approaches described herein using customized hard-wired logic, one or more ASICs or FPGAs, firmware and/or program logic or computer software which, in combination with the computer system, causes or programs computer system 900 to be a special-purpose machine. According to one embodiment, those approaches are performed by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 900, various computer-readable media are involved, for example, in providing instructions to processor 904 for execution. Such a medium may take many forms, including but not limited to, non-volatile media and volatile media. Non-volatile media includes, for example, optical or magnetic disks, such as storage device 910. Volatile media includes dynamic memory, such as main memory 906. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A scan device comprising:
user interface;
one or more processors; and
one or more memories storing instructions which, when processed by the one or more processors cause the scan device to perform:
  receiving user identification data that identifies a user of the scan device;
  based upon the user identification data, retrieving, over one or more networks from a scan definitions server, scan process definitions data that at least identifies one or more scan process definitions that define one or more sets of instructions that are specific to at least the user, and wherein each of the one or more scan process definitions includes:
    definition scan settings data that specifies one or more definition scan settings to be used by the scan device to generate scan data, and
    definition processing settings data that specifies processing to be performed on the scan data by a plurality of network services that are separate from both the scan device and a scan server, and
    definition service tracking information that specifies that service tracking is to be used for the scan data;
  causing to be displayed, on the user interface of the scan device, one or more user interface objects that are associated with the one or more scan process definitions;
  wherein a user interface object, of the one or more user interface objects, is specified for and associated with a scan process definition from the one or more scan process definitions;
  receiving, via the user interface of the scan device, user input that indicates a selection of a particular user interface object from the one or more user interface objects;
  identifying a particular scan process definition that is associated with the particular user interface object that was indicated by the user input;
  identifying, in the particular scan process definition:
    scan settings data that specifies one or more scan settings to be used by the scan device to generate particular scan data,
    processing settings data that specifies processing to be performed on the particular scan data by the plurality of network services that are separate from both the scan device and a scan server, and
    service tracking information that specifies that service tracking is to be used for the particular scan data;
  generating the particular scan data based upon the scan settings data that specifies the one or more scan settings to be used by the scan device to generate the particular scan data;
  generating metadata that includes at least a portion of the scan settings data; and
  transmitting the particular scan data, the metadata, the processing settings data and the service tracking information to the scan server for processing, wherein processing of the service tracking information by the scan server causes the scan server to generate service tracking data that includes at least a portion of the metadata and specifies processing of the particular scan data by a plurality of network services that are separate from both the scan device and the scan server.

2. The scan device of claim 1,
wherein the processing of the service tracking information by the scan server further causes the scan server to transmit the service tracking data to a service usage tracking system for updating a tracking record stored for the user or a user group to which the user belongs; and
wherein the updating the tracking record allows accounting for processing performed on the particular scan data by the plurality of network services for the user.

3. The scan device of claim 2, wherein the instructions, when processed by the one or more processors, further cause:
  generating, based upon the user identification data and the service tracking information, a request for determining eligibility of the user to use a particular network service, from the plurality of network services specified by the processing settings data;
  transmitting the request to the service usage tracking system;
  upon receiving a response from the service usage tracking system, determining, based on the response, whether the user is eligible to use the particular network service; and
  in response to determining that the user is ineligible to use the particular network service, causing to be displayed, on the user interface, a message indicating that the user is ineligible to use the particular network service, and preventing the scan device from using the particular scan process definition to perform a scan operation;
  wherein the user is ineligible to use the particular network service when the service usage tracking system determines that using the particular network service by the user would cause exceeding one or more threshold quotas specified in the tracking record stored for the user or the user group to which the user belongs.

4. The scan device of claim 3, wherein the service tracking data comprises any of: a date, a user identifier, a user name, a page count, a destination identifier, or a service identifier; and wherein updating the tracking record by the service usage tracking system causes the service usage tracking system to update the one or more threshold quotas specified in the tracking record.

5. The scan device of claim 2, wherein:
  the particular scan process definition is represented as Extensible Markup Language (XML) data comprising a plurality of service tracking parameters;
  wherein the plurality of service tracking parameters comprise a service tracking indicator, a service tracking uniform resource locator (URL), and a service identifier;
  wherein the service tracking indicator includes either a "True" flag, or a "False" flag;
  wherein the URL is an Internet address of the service usage tracking system; and
  wherein the service identifier uniquely identifies one of the plurality of network services.

6. The scan device of claim 5, wherein:
the scan process definitions data is generated and modified by a system administrator and stored in the scan definition server; and
wherein the scan process definitions data is generated for any one of: an individual user, a plurality of users, or a plurality of group of users.

7. The scan device of claim 2,
wherein the tracking record is maintained by the service usage tracking system;
wherein the tracking record comprises one or more quotas;
wherein the one or more quotas provide thresholds for any one of: a page limit, a special processing limit, an electronic mail space limit, a fileshare usage limit, a sharepoint storage limit, a network share limit.

8. The scan device of claim 1, wherein:
the plurality of network services comprises one or more of: electronic mail services, fileshare services, sharepoint storage services, network share services, cloud storage services, image processing services, optical character recognition (OCR) services, and other network services.

9. A non-transitory computer-readable storage medium, storing instructions which, when executed by one or more processors, cause:
receiving user identification data that identifies a user of a scan device;
based upon the user identification data, retrieving, over one or more networks from a scan definitions server scan process definitions data that at least identifies one or more scan process definitions that define one or more sets of instructions that are specific to at least the user, and wherein each of the one or more scan process definitions includes:
definition scan settings data that specifies one or more definition scan settings to be used by the scan device to generate scan data, and
definition processing settings data that specifies processing to be performed on the scan data by a plurality of network services that are separate from both the scan device and a scan server, and
definition service tracking information that specifies that service tracking is to be used for the scan data;
causing to be displayed, on a user interface of the scan device, one or more user interface objects that are associated with the one or more scan process definitions;
wherein a user interface object, of the one or more user interface objects, is specified for and associated with a scan process definition from the one or more scan process definitions;
receiving, via the user interface of the scan device, user input that indicates a selection of a particular user interface object from the one or more user interface objects;
identifying a particular scan process definition that is associated with the particular user interface object that was indicated by the user input;
identifying, in the particular scan process definition:
scan settings data that specifies one or more scan settings to be used by the scan device to generate particular scan data,
processing settings data that specifies processing to be performed on the particular scan data by the plurality of network services that are separate from both the scan device and a scan server, and
service tracking information that specifies that service tracking is to be used for the particular scan data;
generating the particular scan data based upon the scan settings data that specifies the one or more scan settings to be used by the scan device to generate the particular scan data;
generating metadata that includes at least a portion of the scan settings data; and
transmitting the particular scan data, the metadata, the processing settings data and the service tracking information to the scan server for processing, wherein processing of the service tracking information by the scan server causes the scan server to generate service tracking data that includes at least a portion of the metadata and specifies processing of the particular scan data by a plurality of network services that are separate from both the scan device and the scan server.

10. The non-transitory computer-readable storage medium of claim 9,
wherein the processing of the service tracking information by the scan server further causes the scan server to transmit the service tracking data to a service usage tracking system for updating a tracking record stored for the user or a user group to which the user belongs; and
wherein the updating the tracking record allows accounting for processing performed on the particular scan data by the plurality of network services for the user.

11. The non-transitory computer-readable storage medium of claim 10, wherein the instructions, when processed by the one or more processors, further cause:
generating, based upon the user identification data and the service tracking information, a request for determining eligibility of the user to use a particular network service, from the plurality of network services specified by the processing settings data;
transmitting the request to the service usage tracking system;
upon receiving a response from the service usage tracking system, determining, based on the response, whether the user is eligible to use the particular network service; and
in response to determining that the user is ineligible to use the particular network service, causing to be displayed, on the user interface, a message indicating that the user is ineligible to use the particular network service, and preventing the scan device from using the particular scan process definition to perform a scan operation;
wherein the user is ineligible to use the particular network service when the service usage tracking system determines that using the particular network service by the user would cause exceeding one or more threshold quotas specified in the tracking record stored for the user or the user group to which the user belongs.

12. The non-transitory computer-readable storage medium of claim 11, wherein the service tracking data comprises any of: a date, a user identifier, a user name, a page count, a destination identifier, or a service identifier; and wherein updating the tracking record by the service usage tracking system causes the service usage tracking system to update the one or more threshold quotas specified in the tracking record.

13. The non-transitory computer-readable storage medium of claim 10, wherein:
the particular scan process definition is represented as Extensible Markup Language (XML) data comprising a plurality of service tracking parameters;

wherein the plurality of service tracking parameters comprise a service tracking indicator, a service tracking uniform resource locator (URL), and a service identifier;
wherein the service tracking indicator includes either a "True" flag, or a "False" flag;
wherein the URL is an Internet address of the service usage tracking system; and
wherein the service identifier uniquely identifies one of the plurality of network services.

14. The non-transitory computer-readable medium of claim 13, wherein:
the scan process definitions data is generated and modified by a system administrator and stored in the scan definition server; and
wherein the scan process definitions data is generated for any one of: an individual user, a plurality of users, or a plurality of group of users.

15. The non-transitory computer-readable storage medium of claim 10,
wherein the tracking record is maintained by the service usage tracking system;
wherein the tracking record comprises one or more quotas;
wherein the one or more quotas provide thresholds for any one of: a page limit, a special processing limit, an electronic mail space limit, a fileshare usage limit, a sharepoint storage limit, a network share limit.

16. The non-transitory computer-readable storage medium of claim 9, wherein:
the plurality of network services comprises one or more of: electronic mail services, fileshare services, sharepoint storage services, network share services, cloud storage services, image processing services, optical character recognition (OCR) services, and other network services.

17. A method, comprising:
receiving user identification data that identifies a user of a scan device;
based upon the user identification data, retrieving, over one or more networks from a scan definitions server, scan process definitions data that at least identifies one or more scan process definitions that define one or more sets of instructions that are specific to at least the user, and wherein each of the one or more scan process definitions includes:
definition scan settings data that specifies one or more definition scan settings to be used by the scan device to generate scan data, and
definition processing settings data that specifies processing to be performed on the scan data by a plurality of network services that are separate from both the scan device and a scan server, and
definition service tracking information that specifies that service tracking is to be used for the scan data;
causing to be displayed, on user interface of the scan device, one or more user interface objects that are associated with the one or more scan process definitions;
wherein a user interface object, of the one or more user interface objects, is specified for and associated with a scan process definition from the one or more scan process definitions;
receiving, via a user interface of the scan device, user input that indicates a selection of a particular user interface object from the one or more user interface objects;
identifying a particular scan process definition that is associated with the particular user interface object that was indicated by the user input;
identifying, in the particular scan process definition:
scan settings data that specifies one or more scan settings to be used by the scan device to generate particular scan data,
processing settings data that specifies processing to be performed on the particular scan data by the plurality of network services that are separate from both the scan device and a scan server
service tracking information that specifies that service tracking is to be used for the particular scan data;
generating the particular scan data based upon the scan settings data that specifies the one or more scan settings to be used by the scan device to generate the particular scan data;
generating metadata that includes at least a portion of the scan settings data; and
transmitting the particular scan data, the metadata, the processing settings data and the service tracking information to the scan server for processing, wherein processing of the service tracking information by the scan server causes the scan server to generate service tracking data that includes at least a portion of the metadata and specifies processing of the particular scan data by a plurality of network services that are separate from both the scan device and the scan server;
wherein the method is performed by one or more computing devices.

18. The method of claim 17,
wherein the processing of the service tracking information by the scan server further causes the scan server to transmit the service tracking data to a service usage tracking system for updating a tracking record stored for the user or a user group to which the user belongs; and
wherein the updating the tracking record allows accounting for processing performed on the particular scan data by the plurality of network services for the user.

19. The method of claim 18, further comprising:
generating, based upon the user identification data and the service tracking information, a request for determining eligibility of the user to use a particular network service, from the plurality of network services specified by the processing settings data;
transmitting the request to the service usage tracking system;
upon receiving a response from the service usage tracking system, determining, based on the response, whether the user is eligible to use the particular network service; and
in response to determining that the user is ineligible to use the particular network service, causing to be displayed, on the user interface, a message indicating that the user is ineligible to use the particular network service, and preventing the scan device from using the particular scan process definition to perform a scan operation;
wherein the user is ineligible to use the particular network service when the service usage tracking system determines that using the particular network service by the user would cause exceeding one or more threshold quotas specified in the tracking record stored for the user or the user group to which the user belongs.

20. The method of claim 19, wherein the service tracking data comprises any of: a date, a user identifier, a user name, a page count, a destination identifier, or a service identifier;

and wherein updating the tracking record by the service usage tracking system causes the service usage tracking system to update the one or more threshold quotas specified in the tracking record.

* * * * *